(12) United States Patent
Yamamoto et al.

(10) Patent No.: US 10,194,428 B2
(45) Date of Patent: Jan. 29, 2019

(54) TERMINAL, BASE STATION, TRANSMISSION METHOD, AND RECEPTION METHOD

(71) Applicant: Panasonic Intellectual Property Corporation of America, Torrance, CA (US)

(72) Inventors: Tetsuya Yamamoto, Kanagawa (JP); Seigo Nakao, Singapore (SG); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/430,227

(22) Filed: Feb. 10, 2017

(65) Prior Publication Data

US 2017/0156138 A1 Jun. 1, 2017

Related U.S. Application Data

(63) Continuation of application No. PCT/JP2015/003360, filed on Jul. 3, 2015.

(30) Foreign Application Priority Data

Aug. 27, 2014 (JP) .................. 2014-172540

(51) Int. Cl.
*H04W 72/04* (2009.01)
*H04L 5/00* (2006.01)
(Continued)

(52) U.S. Cl.
CPC ....... *H04W 72/0413* (2013.01); *H04J 13/004* (2013.01); *H04J 13/18* (2013.01); *H04L 1/1858* (2013.01); *H04L 1/1861* (2013.01); *H04L 5/0007* (2013.01); *H04L 5/0078* (2013.01); *H04W 72/04* (2013.01); *H04W 72/0446* (2013.01)

(58) Field of Classification Search
None
See application file for complete search history.

(56) References Cited

U.S. PATENT DOCUMENTS 9,065,646 B2 * 6/2015 Pajukoski ............. H04L 1/1671
9,320,026 B2 * 4/2016 Lee ................... H04W 72/0413
(Continued)

OTHER PUBLICATIONS

Extended European Search Report, dated Aug. 22, 2017, for the related European Patent Application No. 15836532.0-1874 / 3188560, 8 pages.
Panasonic, "Multiple subframe code spreading for MTC UEs," R1-144108, 3GPP TSG RAN WG1 Meeting #78bis, Agenda Item: 7.3.1.2.1, Ljubljana, Slovenia, Oct. 6-10, 2014, 5 pages.
(Continued)

*Primary Examiner* — Michael J Moore, Jr.
(74) *Attorney, Agent, or Firm* — Seed IP Law Group LLP

(57) ABSTRACT

Repetitions of a control signal across a plurality of first subframes and a data signal allocated to a resource indicated by the control signal are received. Repetition of a response signal for the data signal across a plurality of second subframes is performed, and a transmission signal is generated by multiplying the response signals in the second subframes by, among a plurality of first sequences orthogonal to one another, components of one of the first sequences which is associated with the first subframes, respectively.

7 Claims, 15 Drawing Sheets

(51) Int. Cl.
*H04J 13/00* (2011.01)
*H04J 13/18* (2011.01)
*H04L 1/18* (2006.01)

(56) References Cited

U.S. PATENT DOCUMENTS

| | | | |
|---|---|---|---|
| 2009/0097457 A1* | 4/2009 | Papasakellariou | H04L 1/1607 370/336 |
| 2013/0272258 A1* | 10/2013 | Lee | H04B 7/0413 370/329 |
| 2014/0161094 A1* | 6/2014 | Ro | H04L 5/0037 370/329 |
| 2015/0016312 A1* | 1/2015 | Li | H04W 74/0833 370/280 |
| 2016/0242169 A1* | 8/2016 | Park | H04W 4/70 |
| 2016/0262182 A1* | 9/2016 | Yang | H04W 4/70 |
| 2016/0262186 A1* | 9/2016 | Lee | H04W 4/70 |
| 2016/0337089 A1* | 11/2016 | Chen | H04L 1/1854 |
| 2016/0353420 A1* | 12/2016 | You | H04L 5/0053 |
| 2017/0273027 A1* | 9/2017 | Kim | H04W 52/146 |
| 2017/0346607 A1* | 11/2017 | Chen | H04W 72/1284 |
| 2018/0176892 A1* | 6/2018 | Kim | H04W 72/0406 |

OTHER PUBLICATIONS

International Search Report of PCT application No. PCT/JP2015/003360 dated Sep. 15, 2015.
3GPP TS 36.211 V11.5.0, "Physical channels and modulation (Release 11)", Dec. 2013.
3GPP TS 36.212 V11.4.0, "Multiplexing and channel coding (Release 11)", Dec. 2013.
3GPP TS 36.213 V11.5.0, "Physical layer procedures (Release11)", Dec. 2013.
Seigo Nakao et al., "Performance enhancement of E-UTRA uplink control channel in fast fading environments", Proceeding of 2009 IEEE 69th Vehicular Technology Conference (VTC2009-Spring), Apr. 2009.
3GPP TR 36.888 V12.0.0, "Study on provision of low-cost Machine-Type Communications (MTC) User Equipments (UEs) based on LTE(Release12)", Jun. 2013.
R1-140501, Panasonic, "(E)PDCCH coverage enhancement for MTC, 3GPP TSG RAN WG1 Meeting #76", Feb. 2014.
R1-140641, Sharp, "Discussion on PUCCH for MTC UEs in coverage enhanced mode", 3GPP TSG RAN WG1 Meeting #76, Feb. 2014.
R1-140498, Panasonic, "Proposal of common coverage enhanced subframe length", 3GPP TSG RAN WG1 Meeting #76, Feb. 2014.

\* cited by examiner

TERMINAL, BASE STATION, TRANSMISSION METHOD, AND RECEPTION METHOD

BACKGROUND

1. Technical Field

The present disclosure relates to a terminal, a base station, a transmission method, and a reception method.

2. Description of the Related Art

3GPP LTE (3rd Generation Partnership Project Long Term Evolution) employs OFDMA (Orthogonal Frequency Division Multiple Access) as a communication technique for the downlink.

In wireless communication systems that employ 3GPP LTE, a base station (hereinafter, also referred to as "eNB") sends a synchronization signal (SCH: Synchronization Channel) and a broadcast signal (PBCH: Physical Broadcast Channel) by using predetermined communication resources. In addition, a terminal (hereinafter also referred to as "UE (User Equipment)") catches the SCH first so as to ensure synchronization with the base station. Subsequently, the terminal reads BCH information and acquires base-station specific parameters (e.g., the frequency bandwidth) (refer to, for example, 3GPP TS 36.211 V11.5.0, "Physical channels and modulation (Release 11)," December 2013, 3GPP TS 36.212 V11.4.0, "Multiplexing and channel coding (Release 11)," December 2013, and 3GPP TS 36.213 V11.5.0, "Physical layer procedures (Release11)," December 2013).

In addition, after acquiring the base-station specific parameters, the terminal sends a connection request to the base station and, thus, establishes connection with the base station. The base station sends control information to the terminal with which connection has been established via a control channel, such as PDCCH (Physical Downlink Control Channel), as needed. Thereafter, the terminal attempts to decode the control information contained in a received PDCCH signal (blind detection). That is, the control information includes a CRC (Cyclic Redundancy Check) portion masked with the terminal ID of a destination terminal in the base station. Accordingly, the terminal demasks the CRC portion of the received control information with the terminal ID of the terminal to determine whether the control information is destined for the terminal itself. If, as a result of the demasking in the blind detection, calculation of the CRC has no error, the terminal determines that the control information is destined for itself.

In addition, in LTE, HARQ (Hybrid Automatic Repeat Request) is applied to downlink data from a base station to a terminal. That is, the terminal feeds back, to the base station, a response signal indicating the result of detection of an error in the downlink data. The terminal performs CRC on the downlink data. If there is no error in the result of CRC calculation, the terminal feeds back acknowledgement (ACK) to the base station. However, if there is an error in the result of CRC calculation, the terminal feeds back negative acknowledgement (NACK) to the base station. To feed back the response signal (i.e., the ACK/NACK signal), an uplink control channel, such as a PUCCH (Physical Uplink Control Channel), is used.

Note that the above-described control information sent from the base station includes resource allocation information for identifying a resource allocated to the terminal by the base station. To send the control information, the PDCCH is used. The PDCCH is formed from at least one L1/L2 CCH (L1/L2 Control Channel). Each of the L1/L2 CCHs is formed from at least one CCE (Control Channel Element). That is, a CCE is a basic unit of mapping the control information to the PDCCH. In addition, when an L1/L2 CCH is formed from a plurality of CCEs, a plurality of CCE that are sequentially arranged are allocated to the L1/L2 CCH. In accordance with the number of CCEs needed for sending the control information to a terminal to which resources are to be allocated, the base station allocates the L1/L2 CCH to the terminal. Thereafter, the base station maps the control information to a physical resource corresponding to the CCE of the L1/L2 CCH and transmits the control information.

In addition, the CCEs are associated one-to-one with the resources that constitute the PUCCH (hereinafter, the resources are referred to as "PUCCH resources"). Accordingly, upon receiving the L1/L2 CCH, the terminal identifies a PUCCH resource corresponding to a CCE that constitutes the L1/L2 CCH and sends the ACK/NACK signal to the base station by using the PUCCH resource. However, if the L1/L2 CCH occupies a plurality of consecutive CCEs, the terminal sends the ACK/NACK signal to the base station by using one of the PUCCH resources each corresponding to one of the CCEs (e.g., the PUCCH resource corresponding to the CCE having the smallest index).

In addition, as illustrated in FIG. 1, the timing at which the terminal sends the ACK/NACK signal by using the PUCCH is in a subframe (a subframe n+K in FIG. 1) that is K subframes later than the subframe (a subframe n in FIG. 1) that has received the PDCCH signal and a PDSCH (Physical Downlink Shared Channel) signal having data allocated thereto by the PDCCH signal. For example, K=4 in FDD (Frequency Division Duplex).

As illustrated in FIG. 2, a plurality of ACK/NACK signals transmitted from a plurality of terminals are spread by the ZAC (Zero Auto-correlation) sequence having the Zero Auto-correlation characteristic in the time domain (by multiplying the ACK/NACK signal by the ZAC sequence) and are code-multiplexed in the PUCCH. In FIG. 2, (W(0), W(1), W(2), W(3)) represents the Walsh sequence having a sequence length of 4, and (F(0), F(1), F(2)) represents the DFT sequence having a sequence length of 3.

As illustrated in FIG. 2, in the terminal, the ACK/NACK signal is primarily spread by the ZAC sequence (the sequence length=12) in the frequency domain into a frequency component corresponding to a 1SC-FDMA (Single-Carrier Frequency Division Multiple Access) symbol first. That is, the ZAC sequence having a sequence length of 12 is multiplied by the components of the ACK/NACK signal in the form of a complex number. Subsequently, the ACK/NACK signal subjected to the primary spread and the ZAC sequence serving as a reference signal are secondarily spread by the Walsh sequence (the sequence length=4: W(0) to W(3)) and the DFT sequence (the sequence length=3: F(0) to F(2)), respectively. That is, the components of a signal having a sequence length of 12 (the ACK/NACK signal subjected to the primary spreading or the ZAC sequence serving as a reference signal) are multiplied by the components of an orthogonal sequence (the Walsh sequence or the DFT sequence), respectively. In addition, the secondarily spread signal is transformed into a signal having a sequence length of 12 in the time domain by the Inverse Discrete Fourier Transform (IDFT or IFFT (Inverse Fast Fourier Transform)). Thereafter, a cyclic prefix is added to each of the signals after IFFT. In this manner, a signal for one slot formed from 7 SC-FDMA symbols are generated.

A PUCCH is disposed on each end of the system band along the frequency domain. In addition, the PUCCH resource is allocated to each of the terminals on a subframe basis. Furthermore, a subframe is formed from two slots, and PUCCH frequency hopping occurs between the first slot and the second slot (inter slot frequency hopping).

The ACK/NACK signals from different terminals are spread (multiplied) by using the ZAC sequences defined by different cyclic shift amounts (Cyclic Shift Indices) and orthogonal code sequences corresponding to different sequence numbers (OC indices: Orthogonal Cover Indices). The orthogonal code sequence is a pair of the Walsh sequence and the DFT sequence. Note that the orthogonal code sequence is also referred to as "Block-wise spreading code". Accordingly, the base station can separate the plurality of code-multiplexed ACK/NACK signals by using despreading and correlation processing (refer to, for example, Seigo Nakao, Tomofumi Takata, Daichi Imamura, and Katsuhiko Hiramatsu, "Performance enhancement of E-UTRA uplink control channel in fast fading environments," Proceeding of 2009 IEEE 69th Vehicular Technology Conference (VTC2009-Spring), April 2009). FIG. 3 illustrates a PUCCH resource defined by the sequence number (the OC index: 0 to 2) of an orthogonal code sequence and a cyclic shift index (0 to 11) of the ZAC sequence. If the Walsh sequence having a sequence length of 4 and the DFT sequence having a sequence length of 3 are employed, a maximum of 36 (=3*12) PUCCH resources can be defined in the same time-frequency resource. However, all the 36 PUCCH resource are not always made available. FIG. 3 illustrates an example in which 18 PUCCH resources (#0 to #17) are made available.

In recent years, as an infrastructure for supporting the future information society, M2M (Machine-to-Machine) communication has been expected to realize a service through autonomous communication among devices without decision by the users. A particular example of an M2M system is Smart Grid. The smart grid is an infrastructure system for efficiently supplying life line, such as electricity or gas. For example, the smart grid performs M2M communication between a smart meter installed in a home or a building and a central server so as to autonomously and efficiently control the demand balance of resources. Other examples of an application of the M2M communication system include a monitoring system for commodities management or remote medical care and a remote management of stock and billing in an automatic vending machine.

In particular, as an application of the M2M communication system, much attention has been focused on a cellular system covering a wide communication area. The 3GPP has been studying M2M based on a cellular network to standardize LTE and LTE-Advanced in the name of MTC (Machine Type Communication). In particular, 3GPP has been studying Coverage Enhancement that further expands the coverage area to support MTC communication devices, such as a smart meter, installed in a coverage hole of an existing communication area, such as a basement of a building (refer to, for example, 3GPP TR 36.888 V12.0.0, "Study on provision of low-cost Machine-Type Communications (MTC) User Equipments (UEs) based on LTE," June 2013).

To further extend the coverage area, MTC coverage enhancement plans to provide "Repetition" that transmits the same signal a plurality of times. More specifically, the study of performing repetition transmission in each of channels, such as PDCCH, PDSCH, and PUCCH, has been conducted.

SUMMARY

However, an in-depth study has not yet been conducted on a PUCCH resource by which a terminal that performs the MTC coverage enhancement (referred to as a "terminal that performs repetition transmission" or a "terminal in an MTC coverage enhancement mode") sends an ACK/NACK signal. In particular, it is needed to design a PUCCH resource so that PUCCH resources used by terminals do not conflict with one another.

One non-limiting and exemplary embodiment provides a terminal, a base station, a transmission method, and a reception method capable of preventing conflict of the PUCCH resources among terminals in the MTC coverage enhancement mode.

In one general aspect, the techniques disclosed here feature a terminal including a reception unit that receives repetitions of a control signal across a plurality of first subframes and a data signal allocated to a resource indicated by the control signal, a generation unit that performs repetition of a response signal for the data signal across a plurality of second subframes and generates a transmission signal by multiplying the response signals in the second subframes by, among a plurality of first sequences orthogonal to one another, components of one of the first sequences which is associated with the first subframes, and a transmission unit that transmits the transmission signal, respectively.

According to the aspect of the present disclosure, in the MTC coverage enhancement mode, conflict of the PUCCH resource among terminals can be prevented.

It should be noted that general or specific embodiments may be implemented as a system, a method, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 4:
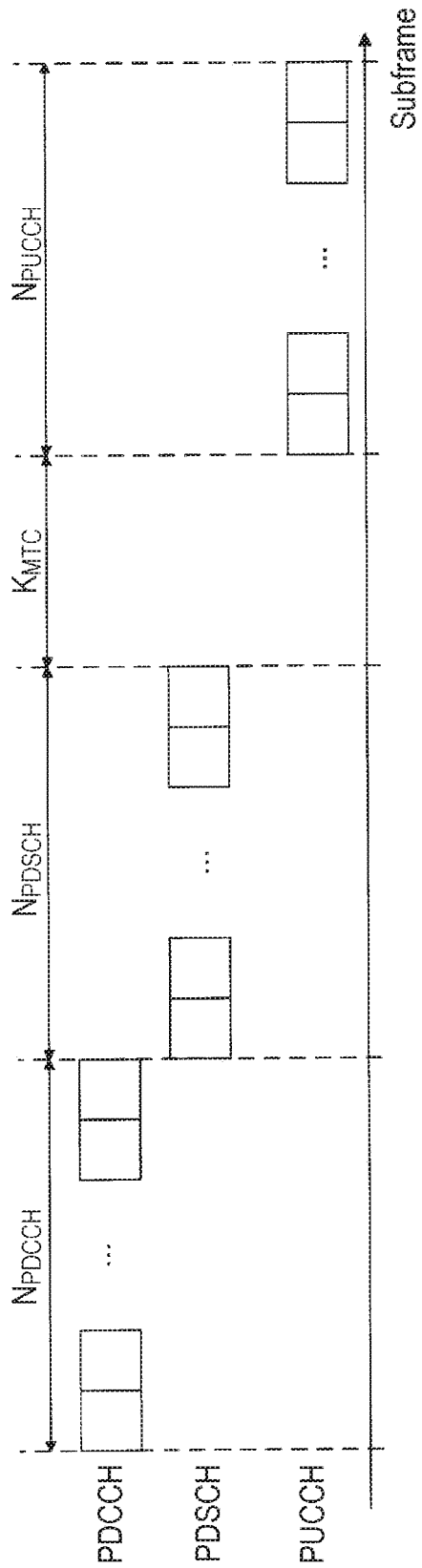
FIG. 4 illustrates the transmission timing of each of channels when repetition transmission is performed.

FIG. 4 illustrates transmission timing of each of channels in the MTC coverage enhancement according to an aspect of the present disclosure. In FIG. 4, $N_{PDCCH}$ represents a repetition level (or number of repetitions) of PDCCH, $N_{PDSCH}$ represents a repetition level (or number of repetitions) of PDSCH, and $N_{PUCCH}$ represents the repetition level (or number of repetitions) of PUCCH. In addition, as illustrated in FIG. 4, in the MTC coverage enhancement, after PDCCH repetition transmission, PDSCH repetition transmission of data allocated to PDSCH by the PDCCH is performed. The transmission timing of the ACK/NACK signal (PUCCH) from the terminal is $K_{MTC}$ subframes later than the subframe that has finished reception through the PDSCH. In addition, in PDCCH or PUCCH repetition transmission, it is being studied that a signal that is to be transmitted a plurality of times is transmitted by using the same resource (refer to, for example, R1-140501, Panasonic, "(E) PDCCH coverage enhancement for MTC, 3GPP TSG RAN WG1 Meeting #76, February 2014, and R1-140641, Sharp, "Discussion on PUCCH for MTC UEs in coverage enhanced mode," 3GPP TSG RAN WG1 Meeting #76, February 2014). Note that the transmission timing of each of the channels illustrated in FIG. 4 is only an example. The timing according to the present disclosure is not limited to the timing in FIG. 4.

In the MTC environment, it is highly likely that the number of terminals connected to one cell increases. If, in such an MTC environment, the PUCCH resources are explicitly allocated, the PUCCH resources need to be reserved for even a plurality of MTC terminals that do not frequently perform communication, resulting in a decrease in the spectral utilization of the PUCCH resources. In addition, in the MTC coverage enhancement, since repetition transmission may be applied to even signaling used to send a message indicating the explicitly allocated PUCCH resources, the overhead of the signaling increases.

Accordingly, in the MTC coverage enhancement according to the present disclosure, like a terminal in a normal mode (a terminal that does not perform repetition transmission), the PUCCH resources are implicitly allocated to increase the spectral utilization of the PUCCH resources. For example, the PUCCH resources are associated one-to-one with the CCEs used for the PDCCH, and the base station provides indication of the PUCCH resources implicitly.

As described above, a plurality of ACK/NACK signals transmitted from the plurality of terminals in a normal mode are spread by the ZAC sequence and the orthogonal code sequence (the Walsh sequence or the DFT sequence) and are code-multiplexed in the PUCCH. In addition, the PUCCH resources used by the terminal in a normal mode are associated one-to-one with the CCEs used by the PDCCH. Furthermore, the transmission timing when the ACK/NACK signal is sent by the terminal in a normal mode is K subframes later than the subframe in which the PDCCH signal and the PDSCH signal having data allocated by the PDCCH have been received (e.g., in FDD, (K=4) subframe later). CCEs of a PDCCH allocated to a plurality of terminals in a normal mode in the same subframe differ from terminal to terminal by scheduling. Accordingly, the ACK/NACK signals sent from the terminals in a normal mode in the same subframe are transmitted by using different PUCCH resources (do not conflict with one another).

In contrast, in the MTC coverage enhancement mode, PUCCH resources used by a plurality of terminals to transmit ACK/NACK signals in the same subframe may be mapped to the same CCE. Accordingly, when the PUCCH resources are mapped to the CCEs used by the PDCCH on a one-to-one basis and are indicated implicitly, the PUCCH resources used by the plurality of terminals to transmit the ACK/NACK signals may conflict with one another.

Figure 5:
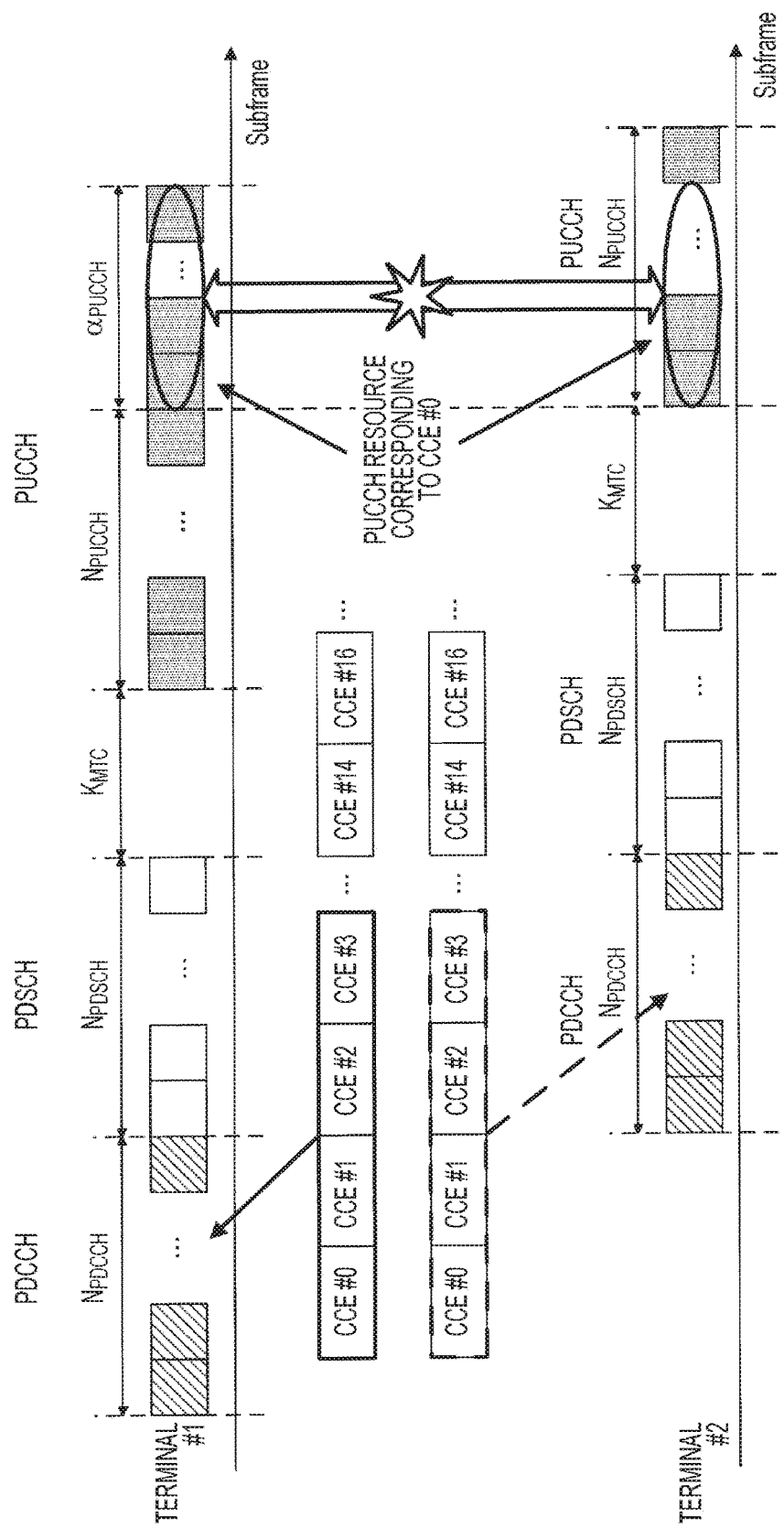
FIG. 5 illustrates an example of conflict between PUCCH resources.
Figure 6:
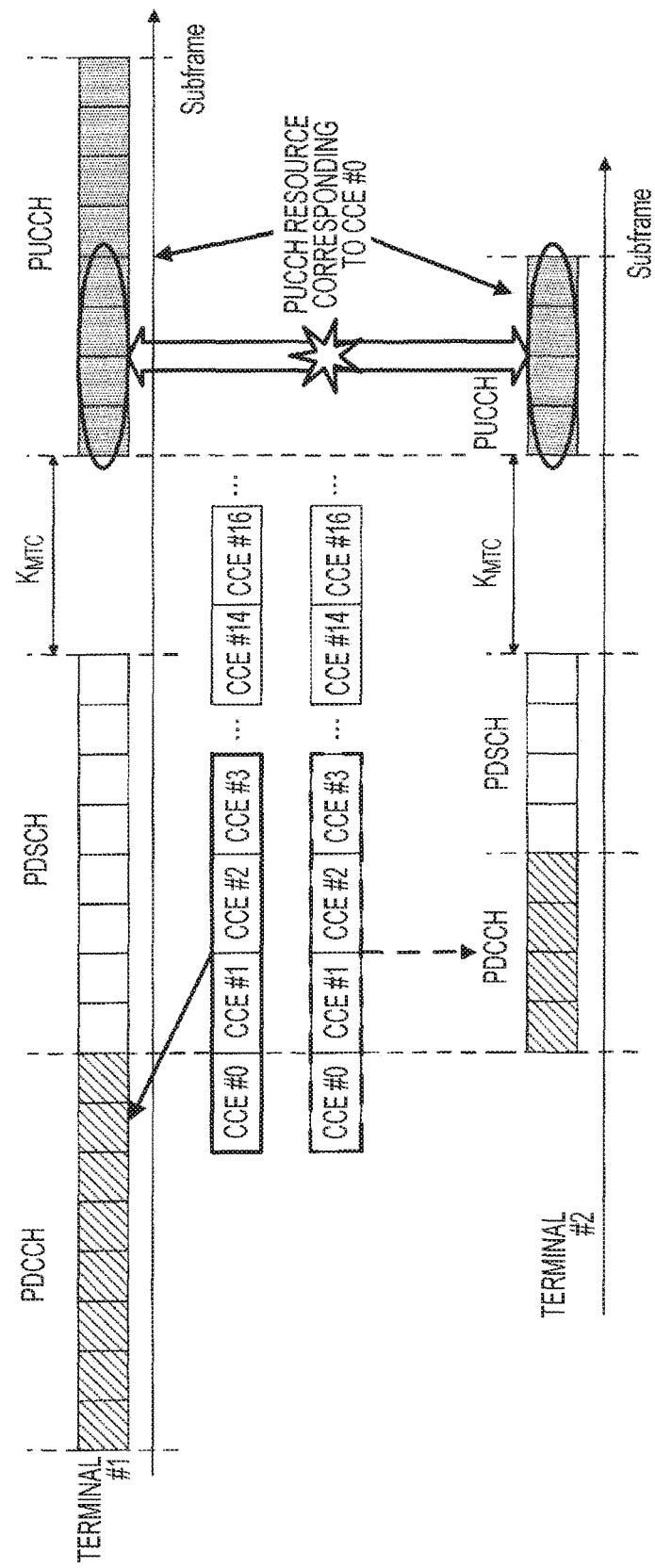
FIG. 6 illustrates an example of conflict between PUCCH resources.

FIGS. 5 and 6 illustrate an example of conflict of the PUCCH resources between the terminals in the MTC coverage enhancement mode.

FIG. 5 illustrates an example of the case in which the repetition level (or number of repetitions) set for an uplink (PUCCH) differs from the repetition level (or number of repetitions) set for the downlink (PDCCH and PDSCH). In FIG. 5, $N_{PDCCH}$ represents the repetition level (or number of repetitions) of the PDCCH for a terminal 1 and a terminal 2, and $N_{PDSCH}$ represents the repetition level (or number of repetitions) of the PDSCH for the terminal 1 and the terminal 2. In addition, $N_{PUCCH}+\alpha_{PUCCH}$ represents the repetition level (or number of repetitions) of the PUCCH of the terminal 1, and $N_{PUCCH}$ represents the repetition level (or number of repetitions) of the PUCCH of the terminal 2. That is, in FIG. 5, the repetition level (or number of repetitions) of the downlink of the terminal 1 is the same as the repetition level (or number of repetitions) of the downlink of the terminal 2, and the repetition level (or number of repetitions) of the uplink of the terminal 1 is higher than the repetition level (or number of repetitions) of the uplink of the terminal 2 by $\alpha_{PUCCH}$.

In addition, in FIG. 5, the base station performs PDCCH transmission to the terminal 1 by using CCE #0 to CCE #3. Furthermore, the base station performs PDCCH transmission to the terminal 2 by using CCE #0 to CCE #3 from a subframe subsequent to the subframe in which PDCCH transmission to the terminal 1 has been completed. That is, the base station performs PDCCH repetition transmission to the terminal 1 and the terminal 2 using the same CCE in different subframes. Accordingly, the terminal 1 and the terminal 2 transmit ACK/NACK signals by using the PUCCH resource associated with CCE #0 in the same subframe. More specifically, as illustrated in FIG. 5, the terminal 1 performs repetition transmission of the ACK/NACK signal across $N_{PUCCH}+\alpha_{PUCCH}$ subframes, and the terminal 2 performs repetition transmission of the ACK/NACK signal across $N_{PUCCH}$ subframes which starts from a subframe subsequent to the $N_{PUCCH}$ subframes in which the terminal 1 has transmitted the ACK/NACK signal. Accordingly, the PUCCH resource used by the terminal 1 in the last $\alpha_{PUCCH}$ subframes of the $N_{PUCCH}+\alpha_{PUCCH}$ subframes in which the terminal 1 performs repetition transmission of PUCCH conflicts with the PUCCH resource used by the terminal 2 in the first $\alpha_{PUCCH}$ subframes of the $N_{PUCCH}$ subframes in which the terminal 2 performs PUCCH repetition transmission.

As described above, in the case where the repetition level (or number of repetitions) of the uplink differs from the repetition level (number of repetitions) of the downlink, even when the PDCCH transmission subframes of the terminals differ from each other, the PUCCH transmission subframes of the terminals may be the same and, thus, the PUCCH resources of the terminals for transmitting the ACK/NACK signals may conflict with each other.

In addition, FIG. 6 illustrates an example of the case in which the repetition levels (or number of repetitions) of the terminals differ from each other. In FIG. 6, each of the repetition levels (or number of repetitions) of PDCCH, PDSCH, and PUCCH of the terminal 1 is 8, and each of the repetition levels (or number of repetitions) of PDCCH, PDSCH, and PUCCH of the terminal 2 is 4.

Furthermore, in FIG. 6, the base station performs PDCCH transmission to the terminal 1 using CCE #0 to CCE #3. In contrast, the base station performs PDCCH transmission to the terminal 2 by using the CCE #0 to the CCE #3 from a subframe subsequent to the subframe in which PDCCH transmission to the terminal 1 has been completed. That is, the base station performs PDCCH repetition transmission to the terminal 1 and the terminal 2 using the same CCE in different subframes. Accordingly, the terminals 1 and 2 transmit ACK/NACK signals using the PUCCH resources associated with CCE #0 in the same subframe.

More specifically, as illustrated in FIG. 6, the terminal 1 performs PDCCH reception across 8 subframes and performs PDSCH reception across the subsequent 8 subframes. In contrast, the terminal 2 performs PDCCH reception across 4 subframes which starts from a subframe subsequent to the subframe in which the terminal 1 has completed the PDCCH reception and, thereafter, performs PDSCH reception across the subsequent 4 subframes. That is, the subframe (the timing) in which the terminal 1 completes the PDSCH reception is the same as the subframe (the timing) in which the terminal 2 completes the PDSCH reception. In this case, the terminal 1 transmits an ACK/NACK signal across 8 subframes, and the terminal 2 transmits an ACK/NACK signal across 4 subframes, where the 8 subframes and the 4 subframes start from the same subframe (the same timing). Accordingly, as illustrated in FIG. 6, the PUCCH resource used in the first 4 subframes in which the terminal 1 performs PUCCH repetition transmission conflicts with the PUCCH resource used in the 4 subframes in which the terminal 2 performs PUCCH repetition transmission.

As described above, in the case where the repetition levels (or number of repetitions) of the terminals differ from each other, even when the PDCCH transmission subframes of the terminals differ from each other, the PUCCH transmission subframes of the terminals may be the same and, thus, the PUCCH resources of the terminals for transmitting the ACK/NACK signals may conflict with each other.

As illustrated in FIG. 5 or FIG. 6, the PUCCH resources of the terminals may conflict with each other depending on the setting of the repetition levels (or number of repetitions). In this case, the base station controls PDCCH allocation to the terminals so that the PUCCH resources of the terminals do not conflict with each other. For example, the base station does not allocate the CCE used by a terminal in a previous subframe to a different terminal in the current subframe. However, in such a case, the spectral efficiency of the PDCCH resource decreases, or the complexity of scheduling increases.

Embodiments of the present disclosure are described in detail below with reference to the accompanying drawings.
Outline of Communication System The following description is given with reference to an FDD (Frequency Division Duplex) system as an example.

In addition, the communication system according to each of the embodiments of the present disclosure is, for example, a system that supports LTE-Advanced. The communication system includes a base station 100 and a terminal 200.

For example, the terminal 200 is set in the normal mode or the MTC coverage enhancement mode. If, for example, the terminal 200 is set in the MTC coverage enhancement mode, the terminal 200 repetitively perform transmission for the PDCCH, the PDSCH, or the PUCCH across a plurality of subframes (repetition transmission). At that time, for example, in the repetition transmission, the same signal is transmitted a plurality of times each in one subframe. That is, the terminal 200 repeatedly transmits the same signal of a predetermined repetition level (or number of repetitions) in successive subframes equal in number to the predetermined repetition level (or number of repetitions).

Figure 7:
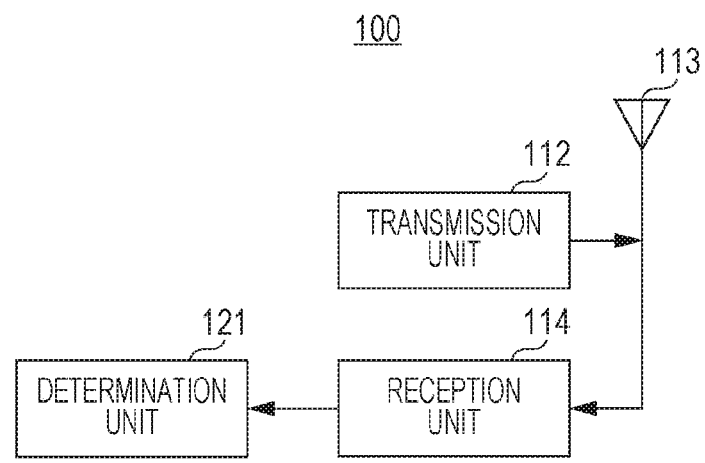
FIG. 7 illustrates the configuration of a main part of a base station according to a first embodiment.

FIG. 7 is a block diagram illustrating the configuration of a main part of the base station 100 according to the embodiment of the present disclosure. In the base station 100 illustrated in FIG. 7, the transmission unit 112 transmits, to the terminal 200, repetition of a control signal (PDCCH) across a plurality of first subframes and a data signal (PDSCH) allocated to a resource indicated by the control signal. The reception unit 114 receives repetitions of a response signal transmitted from the terminal 200 across a plurality of second subframes, which is a response signal (an ACK/NACK signal) for the data signal. The response signals each in one of the plurality of second subframes are multiplied by, among a plurality of first sequences orthogonal to one another (inter-subframe orthogonal code sequences described below, which are also referred to as "inter-subframe orthogonal sequences"), the components of the first one of the sequences associated with the first subframe, respectively. The determination unit 121 determines whether the received response signal (the ACK/NACK signal) indicates either ACK or NACK.

Figure 8:
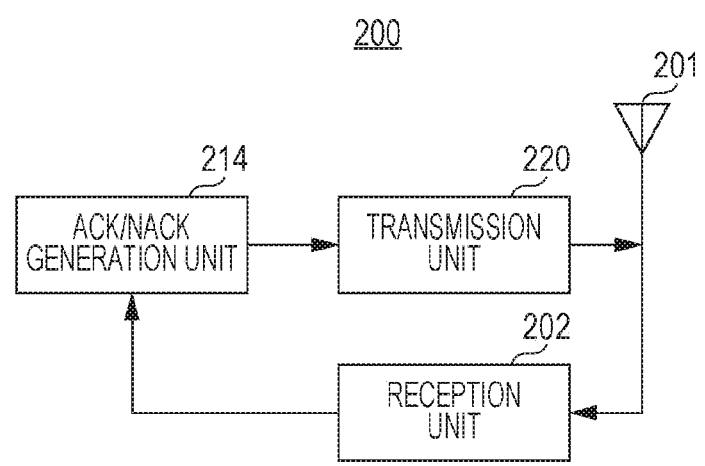
FIG. 8 illustrates the configuration of a main part of a terminal according to the first embodiment.

FIG. 8 is a block diagram illustrating the configuration of a main part of the terminal 200 according to the embodiments of the present disclosure. In the terminal 200 illustrated in FIG. 8, the reception unit 202 receives repetition of a control signal (PDCCH) across the plurality of first subframes and a data signal (PDSCH) allocated to a resource indicated by the control signal. The ACK/NACK generation unit 214 repeats a response signal (an ACK/NACK signal) for the received data signal across a plurality of the second subframes. Thereafter, the ACK/NACK generation unit 214 multiplies the response signals in the second subframes by the components of the sequence associated with the first subframe among the first sequences (inter-subframe orthogonal code sequences) orthogonal to one another, respectively, to generate a transmission signal. A transmission unit 220 transmits the transmission signal.

First Embodiment

Configuration of Base Station

Figure 9:
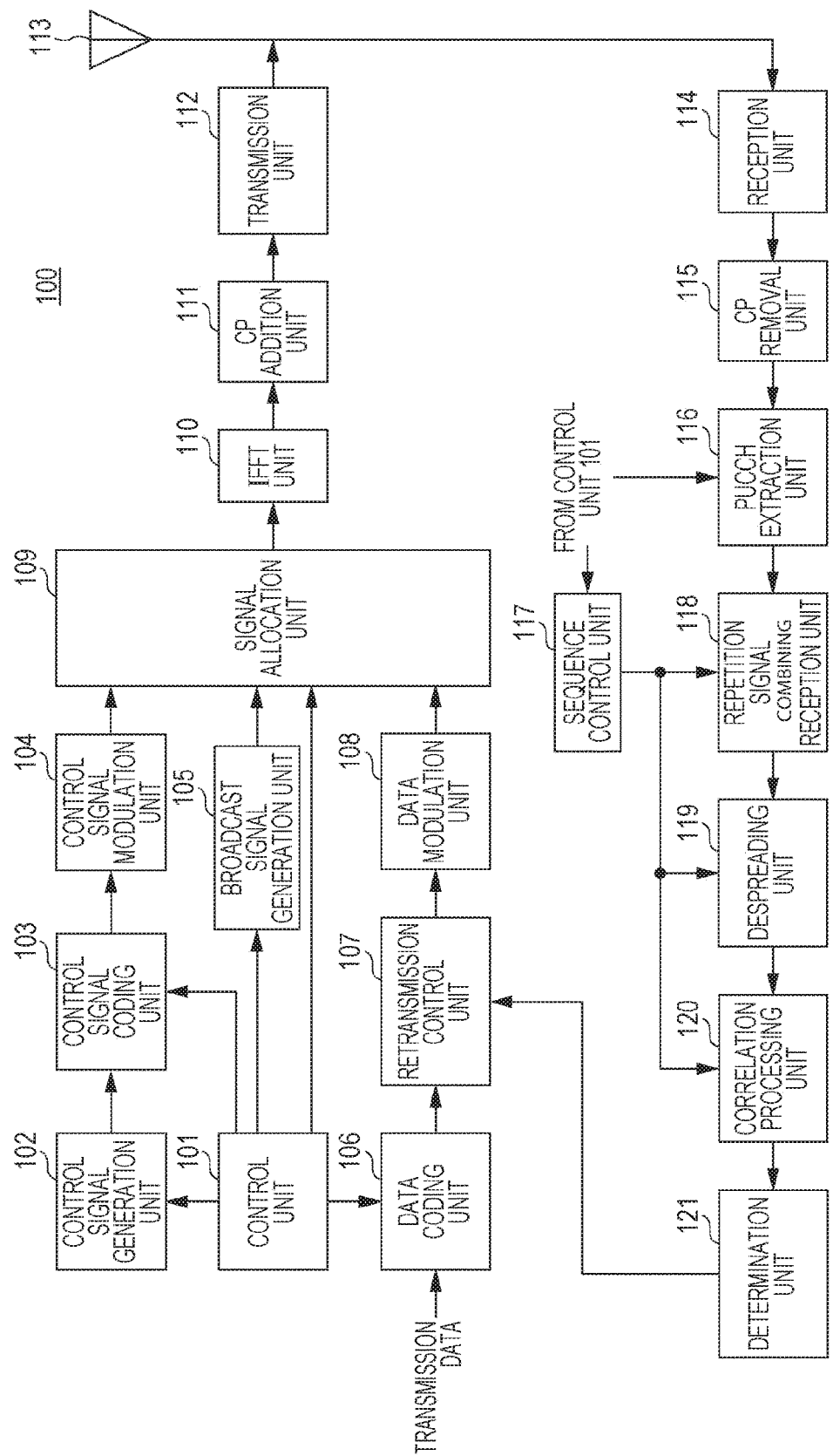
FIG. 9 illustrates the configuration of a base station according to the first embodiment.

FIG. 9 is a block diagram illustrating the configuration of the base station 100 according to the first embodiment of the present disclosure. As illustrated in FIG. 9, the base station 100 includes a control unit 101, a control signal generation unit 102, a control signal coding unit 103, a control signal modulation unit 104, a broadcast signal generation unit 105, a data coding unit 106, a retransmission control unit 107, a data modulation unit 108, a signal allocation unit 109, an IFFT unit 110, a CP addition unit 111, a transmission unit 112, an antenna 113, a reception unit 114, a CP removal unit 115, a PUCCH extraction unit 116, a sequence control unit 117, a repetition signal synthesis reception unit 118, a despreading unit 119, a correlation processing unit 120, and a determination unit 121.

It should be noted that the configurations of the base station 100 illustrated in FIG. 9 are only illustrative. Each of the configurations may be replaced with another configuration or may be removed. All the configurations are not always required for practicing the present disclosure.

The control unit 101 allocates, to the terminal 200, a downlink resource (a downlink control information allocation resource) for transmitting control information and a downlink resource (a downlink data allocation resource) for transmitting downlink data (transmission data) indicated by the control information. The downlink control information allocation resource is selected from among the resources corresponding to the PDCCH or an EPDCCH (Enhanced PDCCH). In addition, the downlink data allocation resource is elected in the resources corresponding to the PDSCH. Furthermore, when there are a plurality of terminals 200, the control unit 101 allocates different resources to the terminals 200. The downlink control information allocation resource is equivalent to the L1/L2 CCH described above. That is, the downlink control information allocation resource is formed from one or more CCEs. In addition, as described above, if indication of the PUCCH resource is implicitly provided by using the CCEs, each of the CCEs is associated with one of the PUCCH resources in the uplink control channel region (the PUCCH region).

In addition, the control unit 101 identifies the PUCCH resource (frequency and the sequence used for primary spreading/secondary spreading) associated with the CCE occupied by the PDCCH including the control information. Furthermore, the control unit 101 identifies the PUCCH resource (the inter-subframe orthogonal code sequence) associated with a subframe in which PDCCH repetition transmission is performed to the terminal 200 set in the MTC coverage enhancement mode (e.g., the first subframe or the last subframe of a plurality of subframes across which the PDCCH repetition transmission is performed). The control unit 101 outputs, to the sequence control unit 117, information regarding the ZAC sequence and the orthogonal code sequence (the inter-subframe orthogonal code sequence and the intra-subframe orthogonal code sequence) which are likely to be used for spreading of the PUCCH signal (the ACK/NACK signal and the reference signal) transmitted from the terminal 200. In addition, the control unit 101 outputs information regarding the frequency to the PUCCH extraction unit 116.

The "inter-subframe orthogonal code sequence" is an orthogonal code sequence that is multiplied by a signal subjected to repetition transmission across a plurality of subframes in the terminal 200 in the MTC coverage enhancement mode. That is, the repeated signals in the subframes are multiplied by the components of the inter-subframe orthogonal code sequence, respectively. The ACK/NACK signals from different terminals 200 are spread using the inter-subframe orthogonal code sequences corresponding to different sequence numbers.

Figure 1:
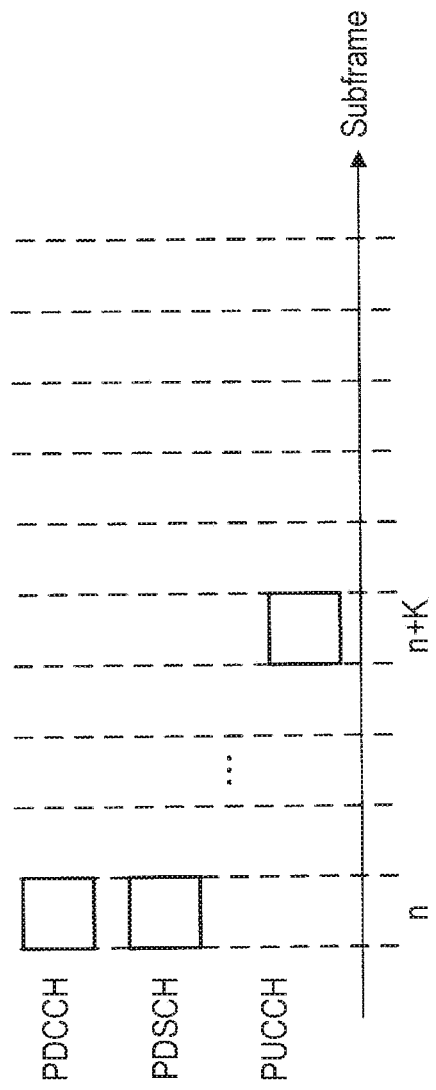
FIG. 1 illustrates the transmission timing of each of channels.
Figure 2:
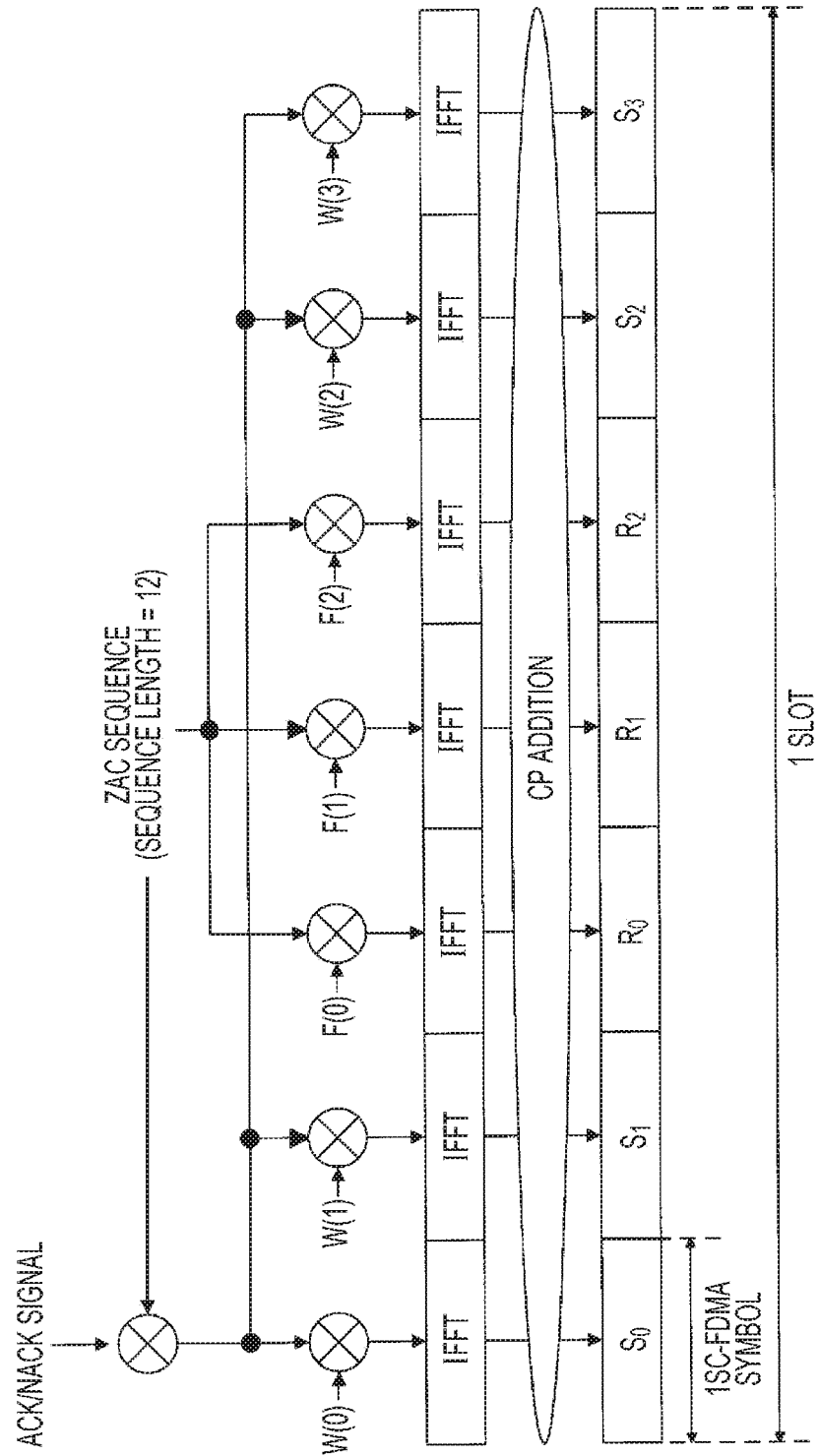
FIG. 2 illustrates a method for spreading a response signal and a reference signal.

Hereinafter, the above-described orthogonal code sequence used in a subframe (each of the slots) (refer to FIG. 1) that differs from an inter-subframe code sequence is referred to as an"intra-subframe orthogonal code sequence". Each of the CCEs is associated with a PUCCH resource including a ZAC sequence and an intra-subframe orthogonal code sequence. In addition, a subframe in which PDCCH repetition transmission is performed (e.g., the first subframe or the last subframe of the plurality of subframes across which PDCCH repetition transmission is performed) is associated with the inter-subframe orthogonal code sequence. For example, the CCEs are associated one-to-one with the PUCCH resources, and the PDCCH subframes across which repetition transmission is performed are associated one-to-one with the inter-subframe orthogonal code sequences.

In addition, the base station 100 and the terminal 200 hold the correspondence between a subframe in which PDCCH repetition transmission is performed and an inter-subframe orthogonal code sequence in advance.

In addition, the control unit 101 determines a coding rate to be used for transmitting the control information to the terminal 200 and outputs the determined coding rate to the control signal coding unit 103. Furthermore, the control unit 101 determines a coding rate to be used when the downlink data is transmitted to the target terminal 200 and outputs the determined coding rate to the data coding unit 106.

Note that since the amount of data of the control information varies depending on the determined coding rate, the control unit 101 allocates a downlink control information allocation resource including a CCE that allows the control information to be mapped thereto in accordance with the amount of data. The control unit 101 outputs information regarding the downlink data allocation resource to the control signal generation unit 102. In addition, the control unit 101 outputs information regarding the downlink data allocation resource and the downlink control information allocation resource to the signal allocation unit 109.

Furthermore, when the MTC coverage enhancement mode is set for the terminal 200, the control unit 101 outputs information regarding the repetition level (number of repetitions) for each of the channels (PDCCH, PDSCH and PUCCH) of the terminal 200 to the control signal generation unit 102 and the data coding unit 106.

In addition, the control unit 101 instructs the broadcast signal generation unit 105 to generate a broadcast signal on the basis of parameters predetermined for each of the base stations.

Furthermore, the control unit 101 generates information about the PUCCH resource and outputs the generated information to the control signal generation unit 102. The information about the PUCCH resource is a parameter used by the terminal 200 to identify the PUCCH resource. An example of the information about the PUCCH resource is information about an offset value to be used for identifying the PUCCH resource number from the CCE number or information about the maximum number of PUCCH resources to be code-multiplexed per resource block disposed in each of the PUCCH regions. Note that the information about the PUCCH resource may be sent to the terminal 200 as broadcast information in the form of a cell-specific value or may be sent to the terminal 200 as signaling of a higher layer.

The control signal generation unit 102 generates a control signal by using the information received from the control unit 101 (the information about the downlink data allocation resource or the information about the repetition level (or number of repetitions) of the PUCCH) and outputs the control signal to the control signal coding unit 103. When there are a plurality of terminals 200, the control signal includes the terminal ID so that each of the terminals 200 is identified. For example, the control signal includes a CRC bit masked by the terminal ID. In addition, when the MTC coverage enhancement mode is set for the terminal 200, the control signal generation unit 102 generates a repetition signal in accordance with the information about the repetition level (number of repetitions) received from the control unit 101. That is, when the repetition level (number of repetitions) of the PDCCH is higher than 1, the control signal generation unit 102 transmits, to the control signal coding unit 103, the same control signal across a plurality of successive subframes equal in number to the repetition level (number of repetitions).

The control signal coding unit 103 encodes the control signal received from the control signal generation unit 102 in accordance with the coding rate received from the control unit 101 and outputs the encoded control signal to the control signal modulation unit 104.

The control signal modulation unit 104 modulates the control signal received from the control signal coding unit 103 and outputs the modulated control signal to the signal allocation unit 109.

The broadcast signal generation unit 105 generates a broadcast signal in accordance with an instruction from the control unit 101 and outputs the broadcast signal to the signal allocation unit 109. The broadcast signal includes, for example, a system bandwidth or a signal relating to the PUCCH resource. In addition, the broadcast signal may be subjected to encoding processing and modulation processing.

The data coding unit 106 encodes transmission data (a bit sequence, that is, downlink data) in accordance with the coding rate received from the control unit 101 and outputs the encoded data signal to the retransmission control unit 107. In addition, when the MTC coverage enhancement mode is set for the terminal 200, the data coding unit 106 generates a repetition signal in accordance with the information about the repetition level (or number of repetitions) received from the control unit 101. That is, if the repetition level (or number of repetitions) of the PDSCH is higher than 1, the data coding unit 106 outputs the same data signal to the retransmission control unit 107 across a plurality of successive subframes equal in number to the repetition level (or number of repetitions).

In initial transmission, the retransmission control unit 107 holds the encoded data signal received from the data coding unit 106 and outputs the encoded data to the data modulation unit 108. The retransmission control unit 107 holds the encoded data signal. In addition, upon receiving NACK for the transmitted data signal from the determination unit 121 (described below), the retransmission control unit 107 outputs the corresponding held data to the data modulation unit 108. In contrast, upon receiving ACK for the transmitted data signal, the retransmission control unit 107 discards the corresponding held data.

The data modulation unit 108 modulates the data signal received from the retransmission control unit 107 and outputs a data modulation signal to the signal allocation unit 109.

The signal allocation unit 109 maps the control signal received from the control signal modulation unit 104, the broadcast signal received from the broadcast signal generation unit 105, and the data modulation signal received from the data modulation unit 106 to downlink resources (e.g., downlink data signal allocation resource and downlink control information allocation resource) and outputs the mapped signal to the IFFT unit 110. More specifically, the signal allocation unit 109 maps the control signal to the resource indicated by the downlink control information allocation resource received from the control unit 101 and maps the data modulation signal to the resource indicated by the downlink data allocation resource received from the control unit 101. Furthermore, the signal allocation unit 109 maps the broadcast signal to a predetermined time/frequency resource.

The IFFT unit 110 performs the IFFT process on the signal received from the signal allocation unit 109 and converts the frequency domain signal into a time domain signal. The IFFT unit 110 outputs the time domain signal to the CP addition unit 111.

The CP addition unit 111 adds a CP to the signal received from the IFFT unit 110 and outputs the signal with a CP (an OFDM signal) to the transmission unit 112.

The transmission unit 112 performs RF (Radio Frequency) processing, such as D/A (Digital-to-Analog) conversion and up-conversion, on the OFDM signal received from the CP adding unit 111 and transmits a radio signal to the terminal 200 via the antenna 113.

The reception unit 114 performs RF processing, such as down-conversion and A/D (Analog-to-Digital) conversion, on the radio signal received from the terminal 200 via the antenna 113 and outputs the obtained received signal to the CP removal unit 115.

The CP removal unit 115 removes the CP added to the reception signal received from the reception unit 114 and outputs the signal with the CP removed to the PUCCH extraction unit 116.

The PUCCH extraction unit 116 extracts the uplink control channel signal (PUCCH) from the signal received from the CP removal unit 115 on the basis of the information received from the control unit 101 and outputs the extracted PUCCH to the repetition signal combining reception unit 118.

The sequence control unit 117 generates, on the basis of the information about the ZAC sequence and the orthogonal code sequence received from the control unit 101, a ZAC sequence and an orthogonal code sequence that are likely to be used for spreading the ACK/NACK signal and a reference signal to be transmitted from the terminal 200. The sequence control unit 117 outputs the inter-subframe orthogonal code sequence among the orthogonal code sequences to the repetition signal combining reception unit 118, outputs the intra-subframe orthogonal code sequence among the orthogonal code sequences to the despreading unit 119, and outputs the ZAC sequence to the correlation processing unit 120.

Note that instead of the ZAC sequence, any sequence that is defined by different cyclic shift amounts may be employed. Furthermore, instead of the Walsh sequence, any sequences that are orthogonal to one another can be employed.

The repetition signal combining reception unit 118 uses the inter-subframe orthogonal code sequence received from the sequence control unit 117 to coherent combine PUCCH (the ACK/NACK signal and the reference signal) repetitively transmitted across a plurality of subframes with signals of portions of the inter-subframe orthogonal code sequence corresponding to the ACK/NACK signal and the reference signal and generates a combined signal. The repetition signal combining reception unit 118 outputs the coherent combined signal to the despreading unit 119.

The despreading unit 119 uses the intra-subframe orthogonal code sequence received from the sequence control unit 117 (the orthogonal sequence to be used by the terminal 200 for secondary spreading) to despread the signal of a portion of the signal received from the repetition signal combining reception unit 118 corresponding to the ACK/NACK signal and outputs the despread signal to the correlation processing unit 120. In addition, the despreading unit 119 despreads the signal of a portion of the signal received from the repetition signal combining reception unit 118 corresponding to the reference signal by using the intra-subframe orthogonal code sequence and outputs the despread signal to the correlation processing unit 120.

The correlation processing unit 120 calculates a correlation value between the ZAC sequence (the ZAC sequence that the terminal 200 is likely to use for primary spreading) input from the sequence control unit 117 and the signal input from the despreading unit 119 (the ACK/NACK signal or the reference signal). The correlation processing unit 120 outputs the correlation value of the ACK/NACK signal to the determination unit 121.

The determination unit 121 determines whether the ACK/NACK signal transmitted from the terminal 200 indicates either ACK or NACK for the transmission data on the basis of the correlation value received from the correlation processing unit 120. The determination unit 121 outputs the result of determination to the retransmission control unit 107.

Configuration of Terminal

Figure 10:
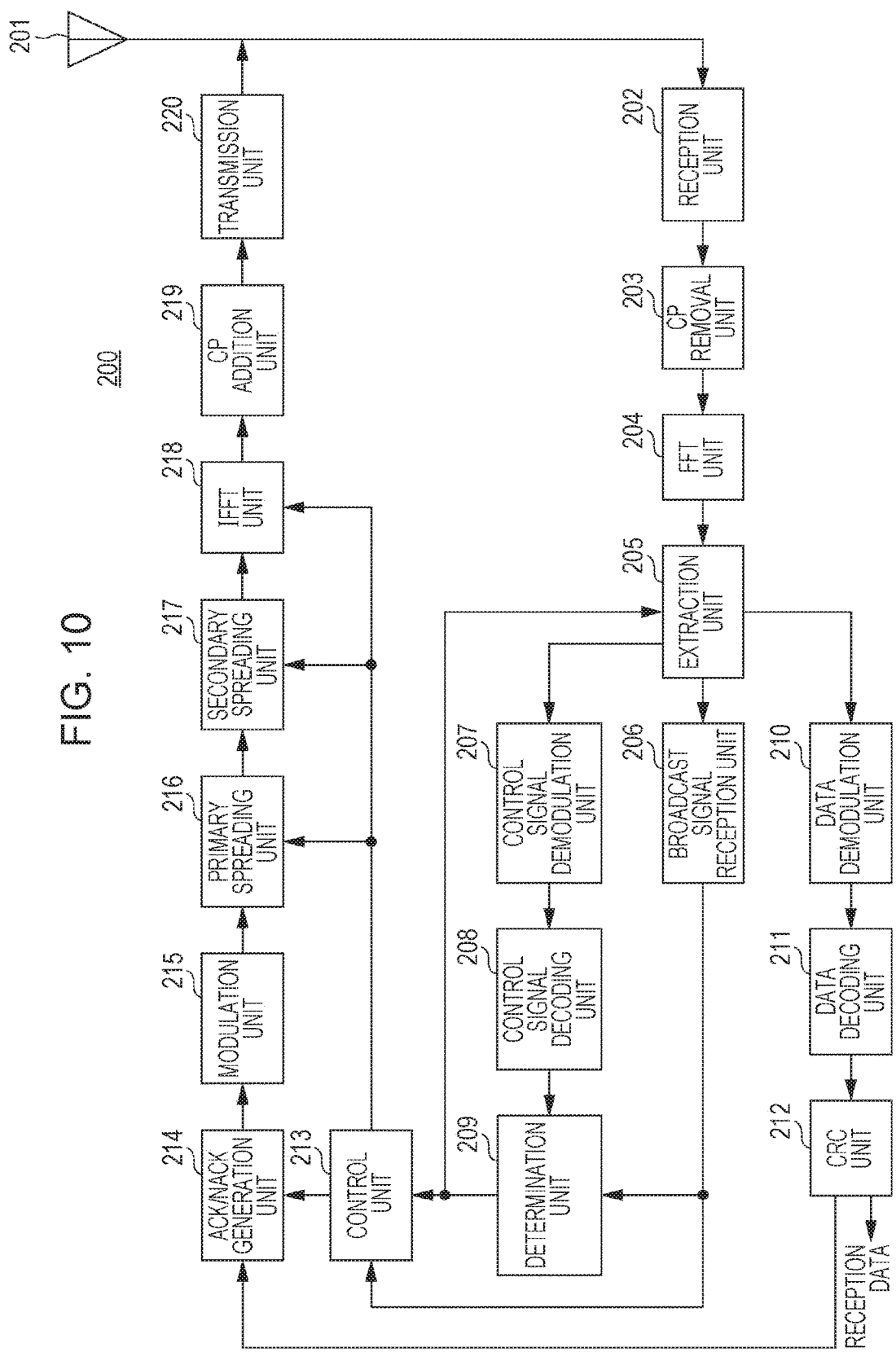
FIG. 10 illustrates the configuration of a terminal according to the first embodiment.

FIG. 10 is a block diagram illustrating the configuration of the terminal 200 according to the first embodiment of the present disclosure. As illustrated in FIG. 10, the terminal 200 includes an antenna 201, a reception unit 202, a CP removal unit 203, an FFT (Fast Fourier Transform) unit 204, an extraction unit 205, a broadcast signal reception unit 206, a control signal demodulation unit 207, a control signal decoding unit 208, a determination unit 209, a data demodulation unit 210, a data decoding unit 211, a CRC unit 212, a control unit 213, an ACK/NACK generation unit 214, a modulation unit 215, a primary spreading unit 216, a secondary spreading unit 217, an IFFT unit 218, a CP addition unit 219, and a transmission unit 220.

It should be noted that the configurations of the terminal 200 illustrated in FIG. 10 are only illustrative. Each of the configurations may be replaced with another configuration or may be removed. All the configurations are not always required for practicing the present disclosure.

The reception unit 202 performs RF processing, such as down-conversion or AD conversion, on the radio signal received from the base station 100 via the antenna 201 to obtain a baseband OFDM signal. The reception unit 202 outputs the OFDM signal to the CP removal unit 203.

The CP removal unit 203 removes the CP added to the OFDM signal received from the reception unit 202 and outputs the signal with the CP removed to the FFT unit 204.

The FFT unit 204 performs FFT processing on the signal received from the CP removal unit 203 to convert the time domain signal into a frequency domain signal. The FFT unit 204 outputs the frequency domain signal to the extraction unit 205.

The extraction unit 205 extracts the broadband signal from the signal received from the FFT unit 204 and outputs the broadcast signal to the broadcast signal reception unit 206. Note that since the resource to which the broadcast signal is mapped is predetermined, the extraction unit 205 extracts the information mapped to the resource and obtains the broadcast signal. The extracted broadcast signal may include, for example, a system bandwidth or a signal related to a PUCCH resource.

In addition, the extracting unit 205 extracts the downlink control channel signal (the PDCCH signal) from the signal received from the FFT unit 204 and outputs the extracted signal to the control signal demodulation unit 207. Furthermore, the extraction unit 205 extracts downlink data (the PDSCH signal) from the signal received from the FFT unit 204 on the basis of the information about the downlink data allocation resource which is destined for the terminal 200 itself and which is received from the determination unit 209.

Thereafter, the extraction unit 205 outputs the downlink data to the data demodulation unit 210. The PDCCH signal includes, for example, the information about the downlink data allocation resource and the information about the repetition level (or number of repetitions) of the PUCCH.

In addition, if the MTC coverage enhancement mode is set for the terminal itself and the PDCCH signal is transmitted through repetition transmission, the extraction unit 205 performs coherent combining on the PDCCH signals transmitted through repetition transmission across the plurality of subframes and extracts the PDCCH signal. Similarly, if the downlink data (the PDSCH signal) is transmitted through repetition transmission, the extraction unit 205 performs coherent combining on the PDSCH signals transmitted through repetition transmission across a plurality of subframes and extracts downlink data.

The broadcast signal reception unit 206 obtains information about the system bandwidth or the PUCCH resource from the broadcast signal received from the extraction unit 205. If the coding processing and modulation processing have been performed on the broadcast signal, the broadcast signal reception unit 206 performs demodulation processing and decoding processing on the broadcast signal. The broadcast signal reception unit 206 outputs the obtained broadcast signal to the determination unit 209 or the control unit 213.

The control signal demodulation unit 207 demodulates the PDCCH signal received from the extraction unit 205 and outputs the demodulated PDCCH signal to the control signal decoding unit 208.

The control signal decoding unit 208 decodes the PDCCH signal received from the control signal demodulation unit 207 and outputs the result of decoding to the determination unit 209.

The determination unit 209 determines whether the control information included in the result of decoding received from the control signal decoding unit 208 is destined for the terminal itself (blind decision). For example, the determination unit 209 de-masks the CRC bits included in the control information by using the terminal ID of the terminal and determines that the control information is destined for the terminal itself if there is no error in the result of CRC calculation. Thereafter, the determination unit 209 outputs, to the extraction unit 205, the information about the downlink data allocation resource included in the control information destined for the terminal. In addition, the determination unit 209 identifies the CCE to which the control information destined for the terminal is mapped and outputs the identification information (the CCE number) of the identified CCE to the control unit 213. Furthermore, the determination unit 209 identifies one of the subframes in which the control information (PDCCH) destined for the terminal has been transmitted through repetition transmission (for example, the first (or last) subframe of the subframes across which the PDCCH repetition transmission is performed) and outputs the identified subframe information to the control unit 213.

The data demodulation unit 210 demodulates the downlink data received from the extraction unit 205 and outputs the demodulated downlink data to the data decoding unit 211.

The data decoding unit 211 decodes the downlink data received from the data demodulation unit 210 and outputs the decoded downlink data to the CRC unit 212.

The CRC unit 212 performs error detection on the downlink data received from the data decoding unit 211 using the CRC and outputs the result of error detection to the ACK/NACK generation unit 214. In addition, as a result of error detection, the CRC unit 212 outputs, as received data, the downlink data determined to be error-free data.

The control unit 213 holds in advance information about the PUCCH resource sent from the base station 100 to the terminal 200 by a broadcast signal or the higher layer signaling (e.g., an offset value used to identify the PUCCH resource number from the CCE number or the maximum number of PUCCH resources to be code-multiplexed per resource block arranged in each of the PUCCH regions) and information about the repetition level (or number of repetitions).

By using the information about the PUCCH resource, the identification information about the CCE received from the determination unit 209, and the subframe information, the control unit 213 identifies the PUCCH resource (the frequency and the sequences used for primary spreading and secondary spreading) corresponding to the identification information of the CCE and the PUCCH resource (the inter-subframe orthogonal code sequence) corresponding to the subframe information. That is, the control unit 213 identifies the PUCCH resource of the uplink control channel on the basis of the identification information of the CCE and the information about the subframe in which the PDCCH transmission has been performed.

The control unit 213 generates a ZAC sequence defined by the cyclic shift amount corresponding to the PUCCH resource to be used and outputs the ZAC sequence to the primary spreading unit 216. In addition, the control unit 213 outputs, to the ACK/NACK generation unit 214, the inter-subframe orthogonal code sequence corresponding to the PUCCH resource to be used and outputs, to the secondary spreading unit 217, the intra-subframe orthogonal code sequence corresponding to the PUCCH resource to be used. Furthermore, the control unit 213 outputs, to the IFFT unit 218, the frequency resource (the subcarrier) corresponding to the PUCCH resource to be used.

In addition, when the terminal is in the MTC coverage enhancement mode, the control unit 213 outputs information about the repetition level (or number of repetitions) of the PUCCH to the ACK/NACK generation unit 214.

The ACK/NACK generation unit 214 generates an ACK/NACK signal for the received downlink data (the data signal) on the basis of the result of error detection received from the CRC unit 212. More specifically, if an error is detected, the ACK/NACK generation unit 214 generates NACK. In contrast, if no error is detected, the ACK/NACK generation unit 214 generates ACK. The ACK/NACK generation unit 214 outputs the generated ACK/NACK signal to the modulation unit 215.

In addition, when the terminal including the ACK/NACK generation unit 214 is in the MTC coverage enhancement mode, the ACK/NACK generation unit 214 performs "repetition" on the ACK/NACK signal in accordance with the information about the repetition level (or number of repetitions) received from the control unit 213. That is, if the repetition level (or number of repetitions) of the PUCCH is higher than 1, the ACK/NACK generation unit 214 outputs the same ACK/NACK signal to the modulation unit 215 across all the successive subframes corresponding to the repetition level (a plurality of subframes equal in number to the number of repetitions) and outputs the same ACK/NACK signals to the modulation unit 215. In addition, when the terminal is in the MTC coverage enhancement mode, the ACK/NACK generation unit 214 multiplies the ACK/NACK signals across the plurality of successive subframes corresponding to the repetition level (or number of repetitions) by the inter-subframe orthogonal code sequence received from the control unit 213. More specifically, among the inter-subframe orthogonal code sequences that are orthogonal to one another, the ACK/NACK generation unit 214 multiplies the ACK/NACK signals repeated across the plurality of subframes by the components of the inter-subframe orthogonal code sequence associated with a subframe in which PDCCH repetition transmission is performed (e.g., the first or the last subframe of the plurality of subframes across which PDCCH repetition transmission is performed), respectively. Thus, the ACK/NACK generation unit 214 generates a transmission signal.

The modulation unit 215 modulates the ACK/NACK signal received from the ACK/NACK generation unit 214 and outputs the modulated ACK/NACK signal to the primary spreading unit 216.

The primary spreading unit 216 primarily spreads the reference signal and the ACK/NACK signal received from the modulation unit 215 by using the ZAC sequence defined by the cyclic shift amount set by the control unit 213 and outputs the primary-spread ACK/NACK signal and reference signal to the secondary spreading unit 217.

The secondary spreading unit 217 secondarily spreads the ACK/NACK signal and the reference signal by using the intra-subframe orthogonal code sequence set by the control unit 213 and outputs the secondary-spread signals to the IFFT unit 218.

The IFFT unit 218 performs mapping of the ACK/NACK signal and the reference signal received from the secondary spreading unit 217 to a subcarrier and performs IFFT processing on the signals by using the frequency resource set by the control unit 213. Thus, the IFFT unit 218 generates a time domain signal. The IFFT unit 218 outputs the generated signal to the CP addition unit 219.

The CP addition unit 219 adds a CP to the signal received from the IFFT unit 218 and outputs, to the transmission unit 220, the signal with the CP added thereto.

The transmission unit 220 performs RF processing, such as D/A conversion and up-conversion, on the signal received from the CP addition unit 219 and transmits a radio signal to the base station 100 via the antenna 201.

Operations of Base Station and Terminal

The operations of the base station 100 and the terminal 200 having the above configuration are described below.

Note that in the following description, a plurality of terminals 200 set in the MTC coverage enhancement mode are in the cell of the base station 100.

In addition, in the following description, the first subframe in which repetition transmission of the signal of each of the channels (PDCCH, PDSCH, and PUCCH) is started has a period equal to a predetermined cell-specific subframe length (Common Subframe length) X (for example, X=4 or 5), and the repetition level (or number of repetitions) is set to an integral multiple of X (refer to, for example, R1-140498, Panasonic, "Proposal of common coverage enhanced subframe length," 3GPP TSG RAN WG1 Meeting #76, February 2014). Hereinafter, the repetition level (or number of repetitions) of PUCCH is simply referred to as "$N_{Rep}$".

That is, when $N_{Rep}$ repetitions are performed, the terminal 200 repeatedly transmits the signal of one subframe across $N_{Rep}$ subframes.

Figure 11:
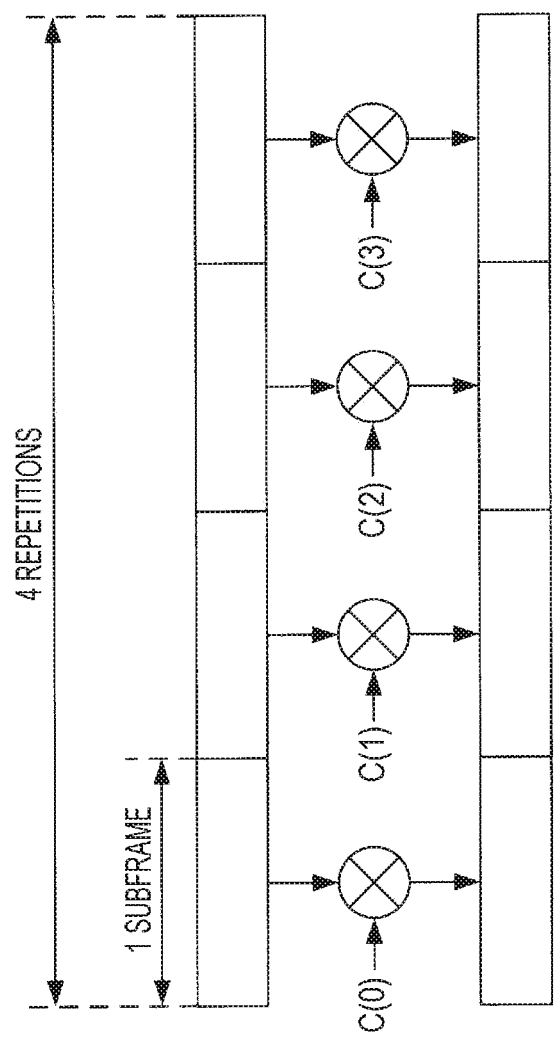
FIG. 11 illustrates an example of a method for spreading an ACK/NACK signal according to the first embodiment.

The terminal 200 multiplies the ACK/NACK signals that are transmitted in all the subframes for repetition transmission by the components from the inter-subframe orthogonal code sequence. For example, FIG. 11 illustrates an example in which the repetition level (or number of repetitions) is 4 ($N_{Rep}$=4) and the sequence length of the inter-subframe orthogonal code sequence is 4 ($N_{SF}=4$). As illustrated in FIG. 11, the terminal 200 multiplies the ACK/NACK signals repeated across four successive subframes by the components (C(0) to C(3)) from the inter-subframe orthogonal code sequence, respectively.

As described above, each of the terminals 200 multiplies the ACK/NACK signals in a plurality of subframes by the components of one of a plurality of inter-subframe orthogonal code sequences orthogonal to one another, respectively, to generate a transmission signal. That is, in addition to the primary spreading using the ZAC sequence defined by the cyclic shift amount and the secondary spreading using the intra-subframe orthogonal code sequence, the terminal 200 performs spreading processing using the inter-subframe orthogonal code sequence on the ACK/NACK signal transmitted through the PUCCH.

Here, the ACK/NACK signals transmitted from different terminals 200 are spread using the inter-subframe orthogonal code sequences corresponding to different orthogonal code sequence numbers (Inter-subframe (SF) OC Indices).

In contrast, the base station 100 receives a signal (including an ACK/NACK signal) from the terminal 200. The ACK/NACK signal transmitted from the terminal 200 for which the MTC enhancement mode is set is repeated across a plurality of subframes. In addition, the ACK/NACK signals repeated across the subframes are multiplied by the components of the inter-subframe orthogonal code sequence, respectively. In this case, the base station 100 performs despreading and correlation processing relating to the inter-subframe orthogonal code sequence first and, thereafter, performs despreading and correlation processing relating to the intra-subframe orthogonal code sequence and the ZAC sequence. In this manner, the base station 100 can separate a plurality of code-multiplexed ACK/NACK signals.

Note that the method for use in each of the terminals 200 to determine the PUCCH resources (a cyclic shift amount, the intra-subframe orthogonal code sequence, and the inter-subframe orthogonal code sequence) used to transmit an ACK/NACK signal is described in detail below.

Figure 3:
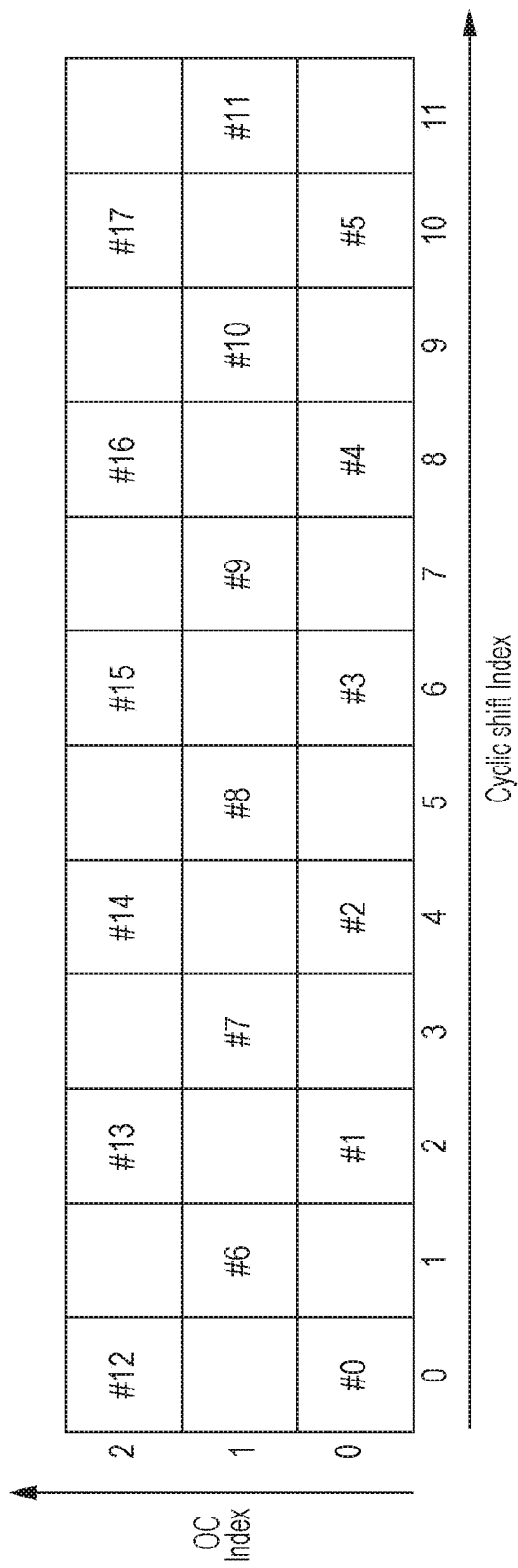
FIG. 3 illustrates an example of a PUCCH resource.
Figure 12:
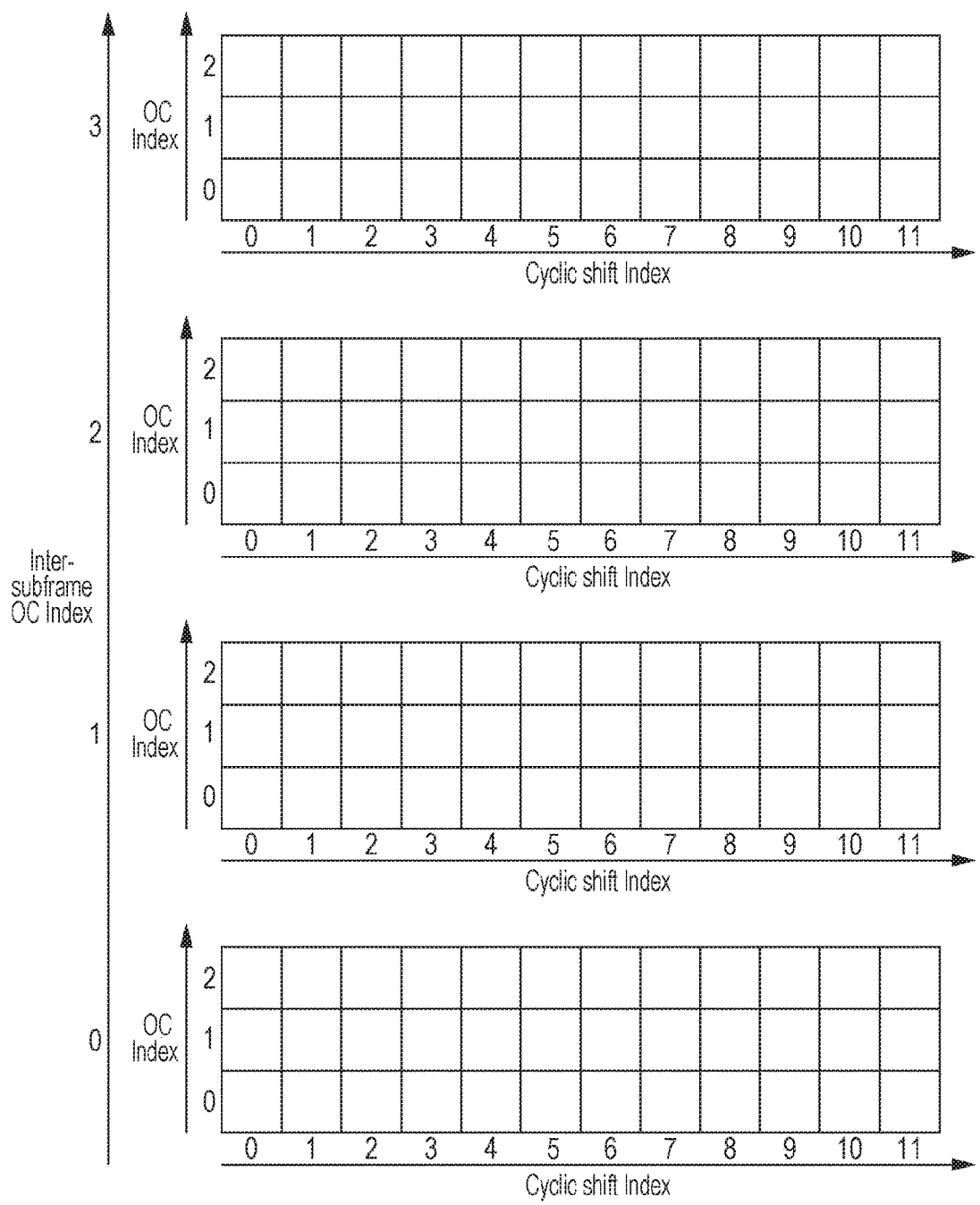
FIG. 12 illustrates a PUCCH resource according to the first embodiment.

FIG. 12 illustrates an example of a PUCCH resource defined by a cyclic shift amount (Cyclic shift Index) of a ZAC sequence, an intra-subframe orthogonal code (OC Index), and an inter-subframe orthogonal code (Inter-SF OC Index). FIG. 12 illustrates an example in which 12 cyclic shift amounts, 4 Walsh sequences each having a sequence length of 4 serving as the inter-subframe orthogonal code sequences and 3 Walsh sequences each having a sequence length of 4 serving as the intra-subframe orthogonal code sequence are used. In this case, up to 144 (=4*3*12) PUCCH resources can be used for the subframes used for repetition transmission with $N_{SF}=4$. The number of PUCCH resources illustrated in FIG. 12 is increased from the number of PUCCH resources defined by OC Index and Cyclic shift Index illustrated in FIG. 3 to the number of PUCCH resources in FIG. 3 times the sequence length (the number of sequences) of the inter-subframe orthogonal code sequence. However, all the 144 PUCCH resources illustrated in FIG. 12 are not always available.

In addition, when the sequence length is a power of 2, a Walsh sequence can be used as the inter-subframe orthogonal code sequence. For example, when the sequence length $N_{SF}=4$, the inter-subframe orthogonal code sequences ($C_0$, $C_1$, $C_2$, $C_3$) are the following four: (1, 1, 1, 1), (1, −1, 1, −1), (1, 1, −1, −1) and (1, −1, −1, 1). In contrast, when the sequence length is not a power of 2, the complex spreading code can be used as the inter-subframe orthogonal code sequence. For example, when the sequence length $N_{SF}=5$, the inter-subframe orthogonal code sequences ($C_0$, $C_1$, $C_2$, $C_3$, $C_4$) are the following five: (1, 1, 1, 1, 1), (1, $e^{j2\pi/5}$, $e^{j4\pi/5}$, $e^{j6\pi/5}$, $e^{j8\pi/5}$), (1, $e^{j8\pi/5}$, $e^{j6\pi/5}$, $e^{j4\pi/5}$, $e^{j2\pi/5}$), (1, $e^{j4\pi/5}$, $e^{j8\pi/5}$, $e^{j2\pi/5}$, $e^{j6\pi/5}$), and (1, $e^{j6\pi/5}$, $e^{j2\pi/5}$, $e^{j8\pi/5}$, $e^{j4\pi/5}$).

The sequence length $N_{SF}$ of the inter-subframe orthogonal code sequence is described next.

According to the present embodiment, the sequence length $N_{SF}$ of the inter-subframe orthogonal code sequence is set to a number the same as the common subframe length (X) which is a predetermined cell-specific or group-specific value. However, the sequence length of the inter-subframe orthogonal code sequence is not limited to a number the same as the common subframe length (X).

Figure 13:
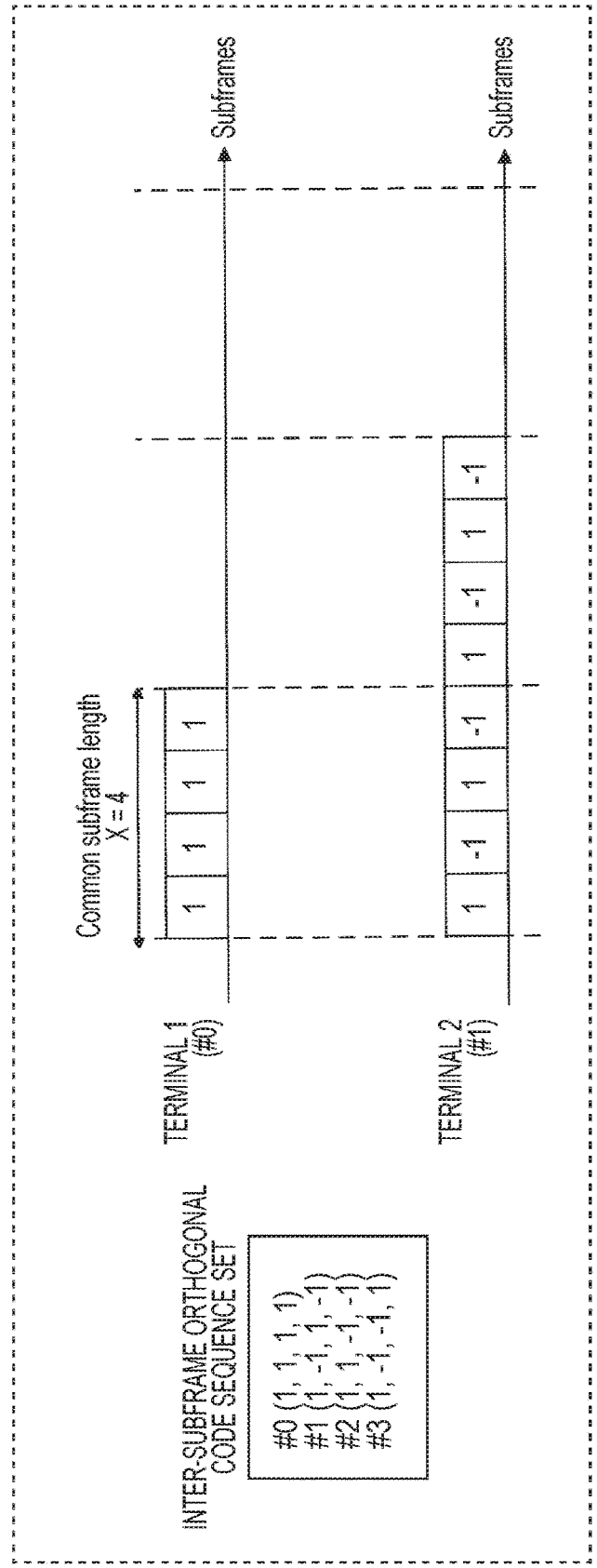
FIG. 13 illustrates an example of an inter-subframe orthogonal code sequence according to the first embodiment.

FIG. 13 illustrates a case in which the sequence length $N_{SF}=X=4$, the repetition level (or number of repetitions) $N_{Rep}^{(1)}$ of the terminal 1=4, and the repetition level (or number of repetitions) $N_{Rep}^{(2)}$ of the terminal 2=8. That is, in FIG. 13, as the sequence set of the inter-subframe orthogonal code sequences, (1, 1, 1, 1), (1, −1, 1, −1), (1, 1, −1, −1) and (1, −1, −1, 1) are set in advance.

One of the inter-subframe orthogonal code sequences in the sequence set is allocated to one of the terminals 200 as the inter-subframe orthogonal code sequence to be used, regardless of the repetition level (or number of repetitions) of the terminal 200.

As illustrated in FIG. 13, the inter-subframe orthogonal code sequence (1, 1, 1, 1) in the sequence set is allocated to the terminal 1 having the repetition level (or number of repetitions) $N_{Rep}^{(1)}=4$.

In contrast, as illustrated in FIG. 13, the inter-subframe orthogonal code sequence (1, −1, 1, −1) in the sequence set is allocated to the terminal 2 having the repetition level (or number of repetitions) $N_{Rep}^{(2)}=8$. If the repetition level (or number of repetitions) is higher than the sequence length of the inter-subframe orthogonal code sequence, the same inter-subframe orthogonal code sequence may be repeatedly allocated as illustrated in FIG. 13, or different inter-subframe orthogonal code sequences may be allocated for different common subframe lengths (X=4 in FIG. 13).

The maximum number of terminals to be code multiplexed by using the inter-subframe orthogonal code sequences is $N_{SF}=X$ (4 in FIG. 13).

In this way, by using the inter-subframe orthogonal code sequence having a cell-specific (predetermined) sequence length (the Common Subframe length-based spreading factor) regardless of the repetition level (or number of repetitions), the orthogonality among the PUCCH resources can be maintained even when the subframes of the terminals 200 for the PUCCH repetition transmission partially overlap.

The method for use in the terminals 200 to determine the PUCCH resources (the cyclic shift amount, the intra-subframe orthogonal code sequence, and the inter-subframe orthogonal code sequence) for transmitting an ACK/NACK signal is described in detail next.

As described above, the CCEs constituting a PDCCH are associated one-to-one with the PUCCH resource (the cyclic shift amount and the intra-subframe orthogonal code sequence). Accordingly, the terminal 200 that has received the PDCCH signal identifies the PUCCH resource corresponding to the CCE constituting the PDCCH. More specifically, the terminal 200 identifies the cyclic shift amount corresponding to the PUCCH resource associated one-to-one with the CCE constituting the PDCCH and the intra-subframe orthogonal code sequence.

Furthermore, according to the present embodiment, a subframe of the PDCCH in which the repetition transmission is performed across a plurality of subframes (e.g., the first one or last one of the plurality of subframes in which PDCCH repetition transmission is performed) is associated with the inter-subframe orthogonal code sequence. Accordingly, if the terminal 200 set in the MTC coverage enhancement mode receives the PDCCH repetition transmission, the terminal 200 identifies the inter-subframe orthogonal code sequence associated with the subframe in which the PDCCH repetition transmission is performed. For example, the inter-subframe orthogonal code sequence is associated one-to-one with a subframe in which PDCCH repetition transmission is performed (for example, the first or last one of the plurality of subframes in which PDCCH repetition transmission is performed).

Figure 14:
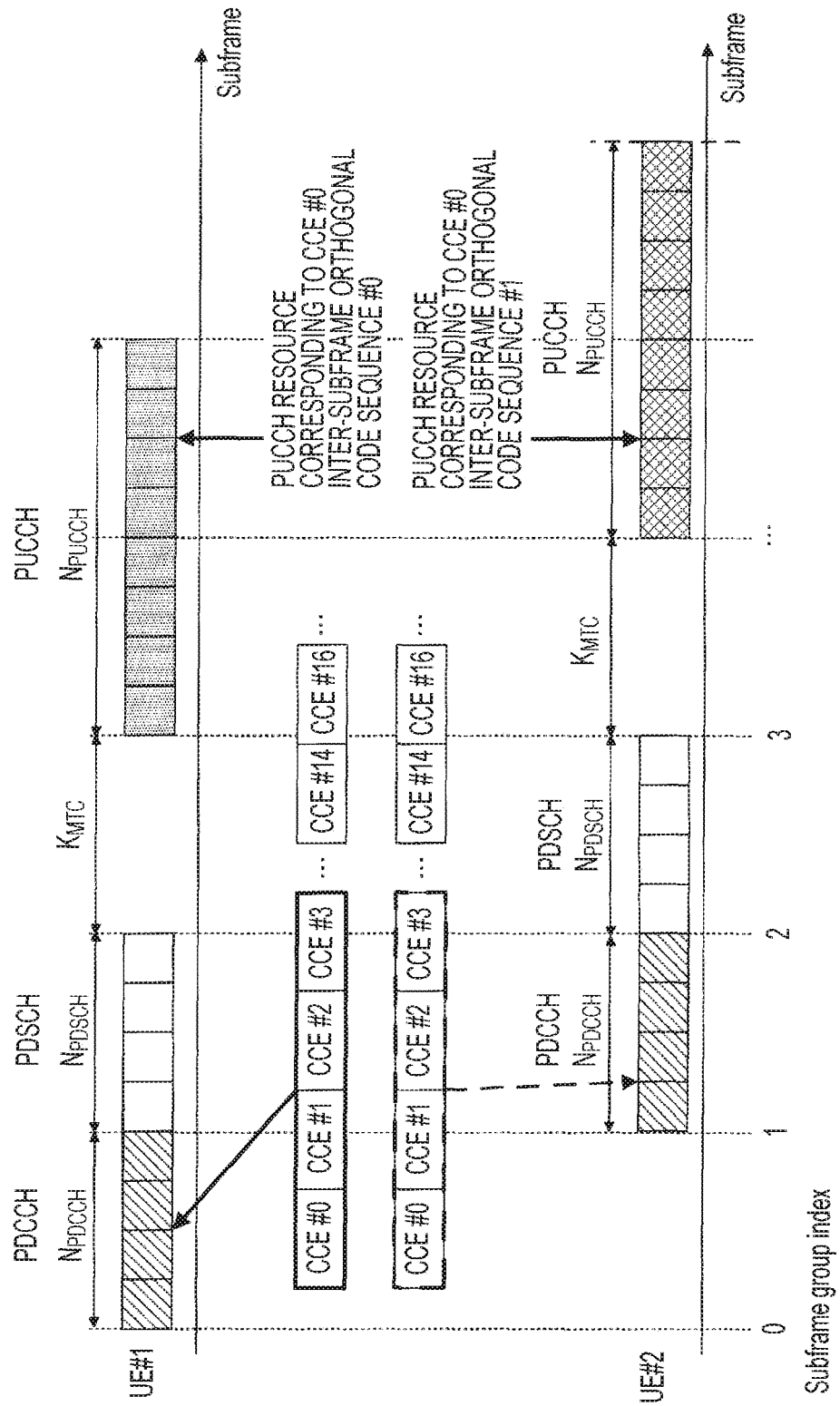
FIG. 14 illustrates the transmission timing of each of channels when repetition transmission is performed according to the first embodiment.

FIG. 14 illustrates the transmission timing in each of the channels according to the present embodiment.

In FIG. 14, the repetition levels (or number of repetitions) of the PDCCH, PDSCH, and PUCCH of the terminals 1 and 2 are denoted as $N_{PDCCH}$, $N_{PDSCH}$, and $N_{PUCCH}$, respectively. In addition, in FIG. 14, $N_{PDCCH}=N_{PDSCH}=4$, and $N_{PUCCH}=8$. That is, in FIG. 14, the downlink repetition level (or number of repetitions) differs from the uplink repetition level (or number of repetitions).

In addition, in FIG. 14, an index for identifying an inter-subframe orthogonal code sequence (a subframe group index) is added to a subframe at predetermined periods (for example, a subframe at Common Subframe length periods). For example, in FIG. 14, the first subframe among the plurality of subframes in which repetition transmission is performed at every four subframes is associated one-to-one with a plurality of inter-subframe orthogonal code sequences.

Note that an inter-subframe orthogonal code sequence may be associated with the last subframe instead of the first subframe among the plurality of subframes across which repetition transmission is performed. In addition, an inter-subframe orthogonal code sequence may be associated with all the multiple subframes (4 subframes in FIG. 14) across which repetition transmission is performed. Furthermore, subframes may be grouped into a subframe group in minimum units of the repetition level (the number of repetitions) (4 subframes in FIG. 14), and an inter-subframe orthogonal code sequence may be associated with the subframe group.

For example, in FIG. 14, the base station 100 starts PDCCH repetition transmission to the terminal 1 by using CCE #0 to CCE #3 in the subframe associated with subframe group index #0. In addition, the base station 100 starts PDCCH repetition transmission to the terminal 2 by using the CCE #0 to CCE #3 in the subframe associated with the subframe group index #1, which is the subframe after the PDCCH transmission to the terminal 1 is completed.

In such a case, as illustrated in FIG. 14, the terminal 1 transmits the ACK/NACK signal through repetition transmission across $N_{PUCCH}$ (=8) subframes. At that time, the terminal 1 uses the ZAC sequence defined by the cyclic shift amount associated with the CCE #0 having the smallest index among the CCEs used for the PDCCH and the intra-subframe orthogonal code sequence. Furthermore, the terminal 1 performs repetition transmission of the ACK/NACK signal by using the inter-subframe orthogonal code sequence associated with the first subframe in which PDCCH repetition transmission is started (the sequence corresponding to the subframe group index #0).

In contrast, as illustrated in FIG. 14, the terminal 2 transmits the ACK/NACK signal through repetition transmission across $N_{PUCCH}$ (=8) subframes which starts from the subframe after the terminal 1 performs repetition transmission of the ACK/NACK signal across $N_{PUCCH}$ (=4) subframes. At that time, the terminal 2 uses the ZAC sequence defined by the cyclic shift amount associated with the CCE #0 having the smallest index among the CCEs used for the PDCCH and the intra-subframe orthogonal code sequence. Furthermore, the terminal 2 performs repetition transmission of the ACK/NACK signal by using the inter-subframe orthogonal code sequence associated with the first subframe in which repetition transmission of the PDCCH is started (the sequence corresponding to the subframe group index #1).

That is, in FIG. 14, although the resources (the ZAC sequence defined by the cyclic shift amount and the intra-subframe orthogonal code sequence) associated with the CCE number are the same in the terminal 1 and the terminal 2, the inter-subframe orthogonal code sequences associated with the first subframe in which PDCCH repetition transmission is started differ from each other. Accordingly, PUCCH resources used by the terminal 1 and the terminal 2 for PUCCH repetition transmission differ from each other, so that the PUCCH resources do not conflict between terminal 1 and terminal 2.

Note that in FIG. 14, the case in which the downlink repetition level (or number of repetitions) differs from the uplink repetition level (or number of repetitions) has been described. However, as in FIG. 6, the same applies to the case in which the repetition level (or number of repetitions) of the terminal 1 differs from the repetition level (or number of repetitions) of the terminal 2. That is, in the case where the transmission subframes of the PDCCH differ among the terminals 200, even if the cyclic shift amount and the intra-subframe orthogonal code sequence used for transmission of the ACK/NACK signal are associated with the same CCE, the PUCCH resources do not conflict among the terminals 200 since the inter-subframe orthogonal code sequence by which the ACK/NACK signal is multiplied differs among the terminals 200.

As described above, according to the present embodiment, in addition to performing the primary spreading and the secondary spreading, the terminal 200 in the MTC coverage enhancement mode performs spreading processing on the ACK/NACK signal using an inter-subframe orthogonal code sequence. At that time, the terminal 200 multiplies the ACK/NACK signals transmitted through repetition transmission across a plurality of subframes by the components of the inter-subframe orthogonal code sequence associated with the subframes used for the repetition transmission of the control signal (PDCCH) indicating resource allocation of the downlink data corresponding to the ACK/NACK signal, respectively. In this manner, even when ACK/NACK signals are transmitted from a plurality of terminals 200 in the same subframe, different inter-subframe orthogonal code sequences are allocated to the terminals 200, so that conflict of the PUCCH resource among the terminals 200 can be avoided.

In addition, according to the present embodiment, an inter-subframe orthogonal code sequence having a constant (the same) sequence length (the spreading factor) is used regardless of the repetition level (or number of repetitions). In this way, the orthogonality among the PUCCH resources can be maintained even when subframes in which the PUCCH repetition transmission is performed partially overlap among terminals 200 (even when the PUCCH repetition levels (or number of repetitions) of the terminals differ from one another).

Furthermore, according to the present embodiment, the inter-subframe orthogonal code sequence constituting the PUCCH resource is associated with a subframe in which the PDCCH repetition transmission is performed (for example, the first or last one of the plurality of subframes in which the PDCCH repetition transmission is performed). In this manner, the base station 100 can implicitly indicate the terminal 200 of the PUCCH resource (the inter-subframe orthogonal code sequence). Thus, according to the present embodiment, signaling for indicating the PUCCH resource is not needed, and an increase in the overhead of signaling can be prevented. Furthermore, since, as described above, conflict of the PUCCH resource is avoided by identifying the PUCCH resource on the basis of the subframe used for PDCCH repetition transmission in each of the terminals 200, the spectral utilization of the PDCCH resources does not decrease or the complexity of the scheduling does not increase.

First Variation

In the above-described embodiment, as illustrated in FIGS. 12 and 14, the cyclic shift amounts are associated one-to-one with the CCEs, and the subframe in which the PDCCH repetition transmission is performed is associated with the inter-subframe orthogonal code sequence. That is, the cyclic shift amount and the intra-subframe orthogonal code sequence are associated with the CCE and, separately, the inter-subframe orthogonal code sequence is associated with the subframe in which PDCCH repetition transmission is performed.

In contrast, according to the present variation, a virtual CCE number is defined. The virtual CCE can be obtained from the CCE used for transmission of the PDCCH and a subframe in which PDCCH repetition transmission is performed (for example, the first or last one of the plurality of subframes in which the PDCCH repetition transmission is performed). Thereafter, the PUCCH resource including the cyclic shift amount (or the sequence defined by the cyclic shift amount), the intra-subframe orthogonal code sequence, and the inter-subframe orthogonal code sequence is associated with the virtual CCE number. For example, the PUCCH resource including the cyclic shift amount, the intra-subframe orthogonal code sequence, and the inter-subframe orthogonal code sequence number is associated one-to-one with the virtual CCE.

Upon receiving the PDCCH (the L1/L2 CCH), the terminal 200 identifies a PUCCH resource (the cyclic shift amount, the intra-subframe orthogonal code sequence, and the inter-subframe orthogonal code sequence) associated with a virtual CCE defined by the CCE constituting the PDCCH and the subframe in which the PDCCH signal is received (for example, the first or last one of the plurality of subframes across which the PDCCH repetition transmission is performed). Thereafter, the terminal 200 transmits the ACK/NACK signal by using the identified PUCCH resource.

For example, the virtual CCE numbers $n_{CCE}$ are defined by the following equation (1):

$$\tilde{n}_{CCE} = n_{CCE} + i_{PDCCH_{Rep}} \cdot N_{CCE} \quad (1)$$

In the equation (1), $n_{cce}$ denotes the CCE number used for PDCCH transmission, $i_{PDCCH\_Rep}$ denotes the subframe in which the PDCCH repetition transmission is performed (for example, the first or last one of a plurality of subframes across which the PDCCH repetition transmission is performed), and $N_{CCE}$ denotes the total number of CCEs in the PDCCH. For example, as illustrated in FIG. 14, $i_{PDCCH\_Rep}$ denotes a number (a subframe group index) attached to a subframe at Common Subframe length periods.

Noted that the $i_{PDCCH\_Rep}$ may be a number associated with the first subframe of a plurality of subframes across which the PDCCH repetition transmission is performed or may be a number associated with the last subframe of the subframes. Alternatively, the $i_{PDCCH\_Rep}$ may be a number associated with all the subframes (4 subframes in FIG. 14) in which the repetition transmission is performed. Still alternatively, the subframes may be grouped into a subframe group in minimum units of the repetition level (the number of repetitions) (4 subframes in FIG. 14), and $i_{PDCCH\_Rep}$ may be a number associated with a subframe group.

The virtual PUCCH resource number $n_{PUCCH\_MTC}$ for the terminal 200 set in the MTC coverage enhancement mode is calculated using the following equation (2):

$$\tilde{n}_{PUCCH\_MTC} = \tilde{n}_{CCE} + \tilde{N}^{(1)}_{PUCCH\_MTC} \quad (2)$$

In equation (2), $n_{CCE}$ denotes the virtual CCE number, and $N^{(1)}_{PUCCH\_MTC}$ denotes the offset value used when identifying a virtual PUCCH resource number from the virtual CCE number.

Figure 15:
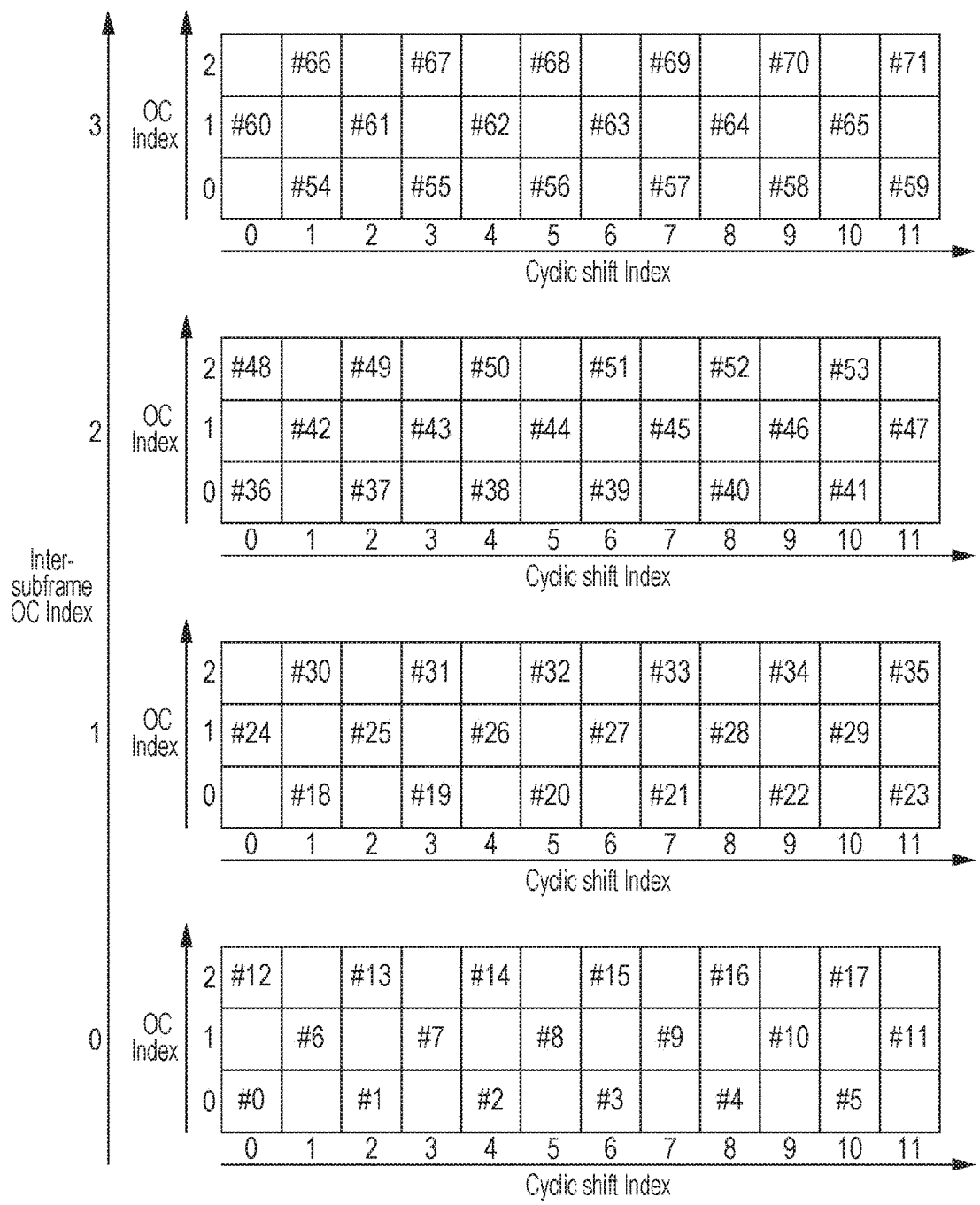
FIG. 15 illustrates a PUCCH resource according to a first variation of the first embodiment.

FIG. 15 illustrates an example of a PUCCH resource when a virtual PUCCH resource number is used. In FIG. 15, if an inter-subframe orthogonal code sequence having a sequence length of 4 is used, a maximum of 144 (=4*3*12) PUCCH resources are available. However, FIG. 15 illustrates an example of a case in which 72 out of 144 PUCCH resources are available.

As illustrated in FIG. 15, the virtual PUCCH resource numbers #0 to #71 are set by the cyclic shift amounts (the Cyclic Shift Indices (0 to 11)), the intra-subframe orthogonal code sequence (the Orthogonal Cover (OC) Index (0 to 2)), and the inter-subframe orthogonal code sequence (Inter-subframe OC Index (0 to 3)). That is, in FIG. 15, the PUCCH resource (the cyclic shift amount, the intra-subframe orthogonal code sequence, and the inter-subframe orthogonal code sequence) is notified implicitly in association with the combination of a CCE and the subframe in which the PDCCH repetition transmission is performed (the virtual CCE defined by the combination).

For example, in FIG. 15, the terminal 200 identifies the cyclic shift amount $n_{CS}$ of the ZAC sequence, the intra-subframe orthogonal code sequence $n_{OC}$, and the inter-subframe orthogonal code sequence $n_{OC_{inter}}$ from the virtual PUCCH resource number $n_{PUCCH\_MTC}$ using the following equations (3) to (6):

$$n_{cs} = [n'_{PUCCH} \cdot \Delta^{PUCCH}_{shift} + \quad (3)$$
$$((n_{oc} \bmod \Delta^{PUCCH}_{shift}) + (n_{oc_{inter}} \bmod \Delta^{PUCCH}_{shift})) \bmod \Delta^{PUCCH}_{shift}] \bmod 12$$

$$n_{oc} = \left\lfloor \frac{n'_{PUCCH} \cdot \Delta^{PUCCH}_{shift}}{12} \right\rfloor \bmod 3 \quad (4)$$

$$n_{oc_{inter}} = \left\lfloor \frac{n'_{PUCCH}}{3 \cdot 12 / \Delta^{PUCCH}_{shift}} \right\rfloor \quad (5)$$

$$n'_{PUCCH} = \begin{cases} \tilde{n}_{PUCCH\_MTC} & \text{if } \tilde{n}_{PUCCH\_MTC} < 3 \cdot 12 \cdot N_{OC_{inter}} / \Delta^{PUCCH}_{shift} \\ (\tilde{n}_{PUCCH\_MTC} - 3 \cdot 12 \cdot N_{OC_{inter}} / \Delta^{PUCCH}_{shift}) \bmod \\ (3 \cdot 12 \cdot N_{OC_{inter}} / \Delta^{PUCCH}_{shift}) & \text{otherwise} \end{cases} \quad (6)$$

In the equations, $\Delta^{PUCCH}_{shift}$ denotes the difference between the cyclic shift amounts (indices) used for one intra-subframe orthogonal code sequence. In the example in FIG. 15, $\Delta^{PUCCH}_{shift}$ is 2. In addition, $N_{oc_{inter}}$ denotes the number of inter-subframe orthogonal code sequences. In the example in FIG. 15, $N_{oc_{inter}}$ is 4.

In this way, in the present variation, the PUCCH resource is uniquely identified on the basis of the combination of the CCE and the subframe used for PDCCH repetition transmission. Even in such a case, as in the first embodiment, the base station 100 can indicate the PUCCH resource to the terminal 200 implicitly. In addition, conflict of PUCCH resources among the terminals 200 which are set in the MTC coverage enhancement mode can be avoided without decreasing the spectral utilization of PDCCH resources or without increasing the complexity of scheduling.

Second Variation

In the above-described embodiment, the case has been described in which conflict of the PUCCH resource among the terminals in the MTC coverage enhancement mode is avoided by associating a subframe in which PDCCH repetition transmission is performed with an inter-subframe orthogonal code sequence.

In contrast, according to the present variation, the multiplication of the inter-subframe orthogonal code sequence used in the above-described embodiment is not necessarily used. In addition to the primary spreading using a sequence defined by the cyclic shift amount and the secondary spreading using an intra-subframe orthogonal code sequence, the terminal 200 may or may not perform spreading processing on the ACK/NACK signal transmitted in the PUCCH by using the inter-subframe orthogonal code sequence.

As described above, the CCEs constituting the PDCCH are associated one-to-one with the PUCCH resources. Accordingly, the terminal 200 that has received the PDCCH signal identifies the PUCCH resources corresponding to the CCEs constituting the PDCCH. More specifically, the terminal 200 identifies a cyclic shift amount and an intra-subframe orthogonal code sequence corresponding to a PUCCH resource that is associated one-to-one with a CCE used for PDCCH transmission.

Furthermore, according to the present variation, a subframe of the PDCCH in which repetition transmission is performed across a plurality of subframes is performed (for example, the first one or the last one of a plurality of subframes across which the PDCCH repetition transmission is performed) is associated with a resource block for PUCCH transmission. Therefore, when the terminal 200 set in the MTC coverage enhancement mode receives the PDCCH repetition transmission, the terminal 200 identifies the resource block associated with the subframe across which the PDCCH repetition transmission is performed. That is, according to the present variation, a resource block is used instead of the inter-subframe orthogonal code sequence used in the above-described embodiment. Note that, for example, the subframes across which the PDCCH repetition transmission is performed are associated one-to-one with the resource blocks.

Figure 16:
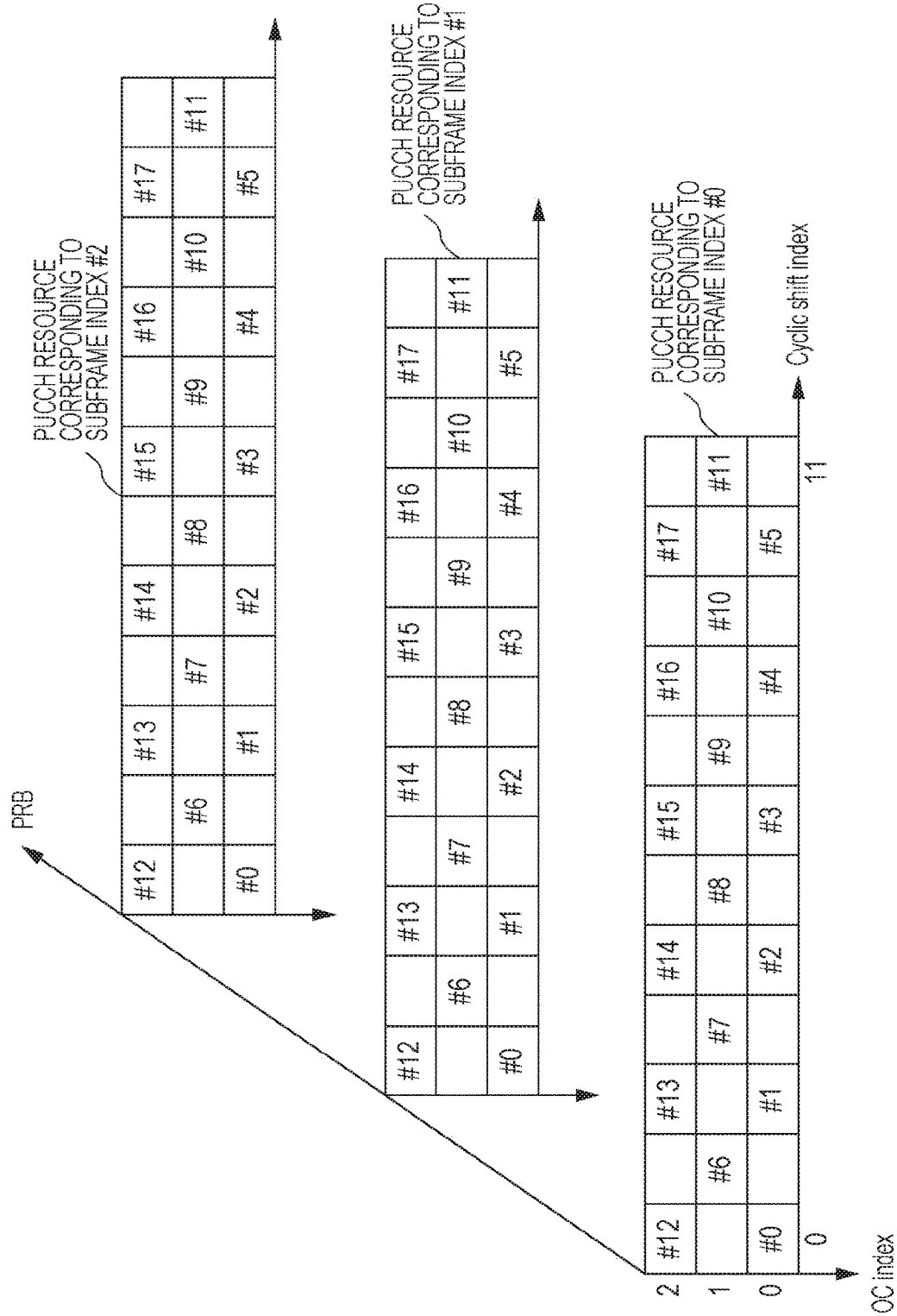
FIG. 16 illustrates a PUCCH resource according to a second variation of the first embodiment.

FIG. 16 illustrates an example of a PUCCH resource according to the present variation. As illustrated in FIG. 16, a PUCCH resource is set in a plurality of resource blocks (PRB: Physical Resource Block) associated with a number (for example, a subframe group index) attached to a subframe in which the PDCCH repetition transmission is performed. That is, in FIG. 16, the PUCCH resource (the cyclic shift amount and the intra-subframe orthogonal code sequence) is indicated implicitly in association with the CCE with which the PDCCH transmission is performed, and the resource block for PUCCH transmission is indicated implicitly in association with the subframe in which the PDCCH transmission is performed.

Note that the resource block for the PUCCH transmission may be associated with the first subframe or the last subframe of a plurality of subframes across which the PDCCH repetition transmission is performed. In addition, the resource block for the PUCCH transmission may be associated with all the subframes (4 subframes in FIG. 14) across which the PUCCH repetition transmission is performed. Furthermore, the subframes may be grouped into a subframe group in minimum units of the repetition level (the number of repetitions) (4 subframes in FIG. 14), and a resource block for the PUCCH transmission may be associated with the subframe group.

According to the present variation, in the case in which the PDCCH transmission subframe differs among the terminals 200, even when the cyclic shift amount used for transmission of the ACK/NACK signal and the intra-subframe orthogonal code sequence are associated with the same CCE, the resource block allocated to the ACK/NACK signal differs among the terminals 200. Accordingly, the PUCCH resources do not conflict among the terminals 200.

In the above description, the embodiments of the present disclosure have been described.

Note that in the above-described embodiment, while the aspect of the present disclosure has been described with reference to the hardware configuration, the present disclosure can be realized by using software in cooperation with hardware.

It should be noted that, the functional blocks used in the description of the embodiment described above are typically implemented as LSI devices, which are integrated circuits. The integrated circuits may control the functional blocks used in the description of the above embodiment and may have an input and an output. The functional blocks may be formed as individual chips, or a part or all of the functional blocks may be integrated into a single chip. The term "LSI" is used herein, but the terms "IC", "system LSI", "super LSI", or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Moreover, should a circuit integration technology replacing LSI appear as a result of advancements in semiconductor technology or other technologies derived flout the technology, the functional blocks could be integrated using such a technology. Another possibility is the application of biotechnology, for example.

A terminal according to the present disclosure includes a reception unit that receives repetitions of a control signal across a plurality of first subframes and a data signal allocated to a resource indicated by the control signal, a generation unit that performs repetition of a response signal for the data signal across a plurality of second subframes and generates a transmission signal by multiplying the response signals in the second subframes by, among a plurality of first sequences orthogonal to one another, components of one of the first sequences which is associated with the first subframes, respectively, and a transmission unit that transmits the transmission signal.

According to the terminal of the present disclosure, the sequence length of the first sequences is constant regardless of the number of repetitions.

According to the terminal of the present disclosure, the number of repetitions is an integral multiple of the subframe period in which the repetition transmission is started, and the sequence length of the first sequences is the same as the subframe period.

According to the terminal of the present disclosure, the number of repetitions is an integer multiple of the subframe period in which the repetition transmission is started, and the subframes at the subframe periods are associated one-to-one with the first sequences.

A base station according to the present disclosure includes a transmission unit that transmits repetitions of a control signal across a plurality of first subframes and a data signal allocated to a resource indicated by the control signal and a reception unit that receives repetitions of a response signal for the data signal across a plurality of second subframes, where the response signals in the second subframes are multiplied by, among a plurality of first sequences orthogonal to one another, components of one of the first sequences which is associated with the first subframes, respectively.

A transmission method according to the present disclosure includes a reception step of receiving repetitions of a control signal across a plurality of first subframes and a data signal allocated to a resource indicated by the control signal, a generation step of performing repetition of a response signal for the data signal across a plurality of second subframes and generating a transmission signal by multiplying the response signals in the second subframes by, among a plurality of first sequences orthogonal to one another, components of one of the first sequences which is associated with the first subframes, respectively, and a transmission step of transmitting the transmission signal.

A reception method according to the present disclosure includes a transmission step of transmitting repetitions of a control signal across a plurality of first subframes and a data signal allocated to a resource indicated by the control signal and a reception step of receiving repetitions of a response signal for the data signal across a plurality of second subframes, where the response signals in the second subframes are multiplied by, among a plurality of first sequences orthogonal to one another, components of one of the first sequences which is associated with the first subframes, respectively.

According to an aspect of the present disclosure is useful for mobile communication systems.

What is claimed is:

1. A terminal comprising:
   a receiver, which, in operation, receives repetitions of a control signal across a plurality of first subframes and a data signal allocated to a resource indicated by the control signal;
   a generator, which, in operation, performs repetition of a response signal for the data signal across a plurality of second subframes and generates a transmission signal by multiplying the response signals in the plurality of second subframes by respective components of an inter-subframe orthogonal code sequence which is associated with one of the plurality of first subframes, the inter-subframe orthogonal code sequence being one of a plurality of sequences which are orthogonal to one another; and
   a transmitter, which, in operation, transmits the transmission signal.

2. The terminal according to claim 1, wherein a sequence length of the plurality of sequences is constant regardless of a number of repetitions of the repetition of the response signal.

3. The terminal according to claim 1, wherein a number of repetitions of the repetition of the response signal is an integer multiple of a subframe period in which repetition transmission is started, and a sequence length of the plurality of sequences is the same as the subframe period.

4. The terminal according to claim 1, wherein a number of repetitions of the repetition of the response signal is an integer multiple of a subframe period in which repetition transmission is started, and subframes at the subframe periods are associated one-to-one with the plurality of sequences.

5. A base station comprising:
   a transmitter, which, in operation, transmits repetitions of a control signal across a plurality of first subframes and a data signal allocated to a resource indicated by the control signal; and
   a receiver, which, in operation, receives repetitions of a response signal for the data signal across a plurality of second subframes, the response signals in the plurality of second subframes being multiplied by respective components of an inter-subframe orthogonal code sequence which is associated with one of the plurality of first subframes, the inter-subframe orthogonal code sequence being one of a plurality of sequences which are orthogonal to one another.

6. A transmission method comprising:
   receiving repetitions of a control signal across a plurality of first subframes and a data signal allocated to a resource indicated by the control signal;
   performing repetition of a response signal for the data signal across a plurality of second subframes and generating a transmission signal by multiplying the response signals in the plurality of second subframes by respective components of an inter-subframe orthogonal code sequence which is associated with one of the plurality of first subframes, the inter-subframe orthogonal code sequence being one of a plurality of sequences which are orthogonal to one another; and
   transmitting the transmission signal.

7. A reception method comprising:
   transmitting repetitions of a control signal across a plurality of first subframes and a data signal allocated to a resource indicated by the control signal; and
   receiving repetitions of a response signal for the data signal across a plurality of second subframes, the response signals in the plurality of second subframes being multiplied by respective components of an inter-subframe orthogonal code sequence which is associated with one of the plurality of first subframes, the inter-subframe orthogonal code sequence being one of a plurality of sequences which are orthogonal to one another.

* * * * *